US011115306B2

(12) United States Patent
Oshiba

(10) Patent No.: US 11,115,306 B2
(45) Date of Patent: Sep. 7, 2021

(54) TRANSMISSION DEVICE, AVAILABLE BANDWIDTH ESTIMATION DEVICE, AVAILABLE BANDWIDTH ESTIMATION SYSTEM, METHOD, AND RECORDING MEDIUM

(71) Applicant: NEC CORPORATION, Tokyo (JP)

(72) Inventor: Takashi Oshiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 33 days.

(21) Appl. No.: 16/610,146

(22) PCT Filed: May 11, 2018

(86) PCT No.: PCT/JP2018/018277
§ 371 (c)(1),
(2) Date: Nov. 1, 2019

(87) PCT Pub. No.: WO2018/212085
PCT Pub. Date: Nov. 22, 2018

(65) Prior Publication Data
US 2020/0092190 A1     Mar. 19, 2020

(30) Foreign Application Priority Data
May 15, 2017   (JP) .............................. JP2017-096507

(51) Int. Cl.
*H04L 12/26*       (2006.01)
(52) U.S. Cl.
CPC ...... *H04L 43/0894* (2013.01); *H04L 43/0858* (2013.01)
(58) Field of Classification Search
CPC . H04L 43/0894; H04L 43/0858; H04L 47/00; H04L 41/0896; H04L 43/0876
See application file for complete search history.

(56) References Cited

U.S. PATENT DOCUMENTS 5,477,531 A * 12/1995 McKee ................ H04L 1/243
370/249

FOREIGN PATENT DOCUMENTS

| JP | 2011-142622 A | 7/2011 |
| JP | 5928574 B2 | 6/2016 |
| WO | 2004/089027 A1 | 10/2004 |

OTHER PUBLICATIONS

Takashi Oshiba et al., "Robust available bandwidth estimation against dynamic behavior of packet scheduler in operational LTE networks", IEEE ISCC, 2016, pp. 1276-1283.
International Search Report for PCT/JP2018/018277 dated Jul. 31, 2018 [PCT/ISA/210].
Written Opinion of the International Searching Authority for PCT/JP2018/018277 dated Jul. 18, 2018 [PCT/ISA/237].

* cited by examiner

*Primary Examiner* — Dady Chery
(74) *Attorney, Agent, or Firm* — Sughrue Mion, PLLC

(57) ABSTRACT

In order to enable to reduce a communication load while maintaining estimation accuracy of available bandwidth estimation being high, a transmission method includes: transmitting estimation packets, a packet size of each of which successively increases, to an available bandwidth estimation device at equal intervals, and, when receiving a signal indicating that a reception interval between the estimation packets at the available bandwidth estimation device starts to increase, stopping the transmission of the estimation packets.

4 Claims, 15 Drawing Sheets

TRANSMISSION DEVICE, AVAILABLE BANDWIDTH ESTIMATION DEVICE, AVAILABLE BANDWIDTH ESTIMATION SYSTEM, METHOD, AND RECORDING MEDIUM

CROSS REFERENCE TO RELATED APPLICATIONS

This application is a National Stage of International Application No. PCT/JP2018/018277 filed May 11, 2018, claiming priority based on Japanese Patent Application No. 2017-096507, filed May 15, 2017, the disclosures of which are incorporated herein in their entirety by reference.

TECHNICAL FIELD

The present invention relates to a transmission device, an available bandwidth estimation device, an available bandwidth estimation system, a method, and a recording medium for estimating an available bandwidth being a free bandwidth of a communication line by transmitting and receiving a packet string.

BACKGROUND ART

An available bandwidth (also referred to as a usable bandwidth) of a communication line is a free bandwidth acquired by subtracting other traffic (hereinafter referred to as cross traffic) flowing in a network from a physical bandwidth of a bottleneck link in the communication line. For example, when a physical bandwidth of a bottleneck link in the communication line is 100 Mbps, and cross traffic is 30 Mbps, an available bandwidth is 100−30=70 Mbps.

Estimating a present value of an available bandwidth that fluctuates moment by moment is important in video chatting, a videophone, a videoconference, and the like that perform communication by bidirectionally transmitting images between terminals. The reason is that holding an image transmission rate down to an estimated value of an available bandwidth or less can prevent the total of the image transmission rate and cross traffic from exceeding a physical bandwidth of a bottleneck link in a communication line, and therefore image quality can be secured.

An example of an estimation method of an available bandwidth is described in PTL 1. In this method, as illustrated in FIG. 16, a transmitting-side device transmits, to a receiving-side device, a chunk of a plurality of estimation packets (hereinafter referred to as a packet train) for available bandwidth estimation with gradually increasing packet sizes, at a transmission interval between the estimation packets being an equal interval.

By the transmitting-side device transmitting the aforementioned packet train, a transmission rate of each estimation packet in the packet train linearly increases. In a case of a transmission rate of an estimation packet exceeding an available bandwidth of a network when the packet train passes through the network, a packet is temporarily queued in a device on the network, such as a router or a switch (a delay due to queuing is hereinafter referred to as a queuing delay). Accordingly, a reception interval between estimation packets at the receiving-side device becomes longer than a transmission interval at the transmitting-side device.

By use of the property, in the method described in PTL 1, the receiving-side device identifies an estimation packet from which a reception interval at the receiving-side device starts to increase compared with a transmission interval at the transmitting-side device, and calculates an available bandwidth by dividing a packet size of the estimation packet by the transmission interval.

On the other hand, with arrival of an age of the Internet of Things (IoT), there are growing needs for collecting data from a large number of sensors through a narrowband wireless network at a plant, a warehouse, an airport, a harbor, and the like. Accurate estimation of an available bandwidth of a wireless network allows avoidance of congestion even when there are a large number of sensors by, for example, adjusting a data transmission cycle (and an amount of transmission data) from the sensors, based on the available bandwidth. Further, transmission of a packet train by itself may cause congestion in a narrowband environment, and therefore more reduction of a communication load due to a packet train is required compared with a case in a broadband environment such as Long Term Evolution (LTE).

CITATION LIST

Patent Literature

[PTL 1] Japanese Patent No. 5928574

Non Patent Literature

[NPL 1] T. Oshiba, et al., "Robust available bandwidth estimation against dynamic behavior of packet scheduler in operational LTE networks," IEEE ISCC, 2016, pp. 1276 to 1283

SUMMARY OF INVENTION

Technical Problem

However, the method described in PTL 1 cannot reduce a communication load while maintaining high estimation accuracy. The reason is that, when a number of estimation packets in a packet train is decreased in order to reduce a communication load in the method described in PTL 1, a true value of an available bandwidth may not fall within a search range of the available bandwidth, and estimation accuracy may degrade.

As a specific example, a case of a number of estimation packets in a packet train being 10 is considered. A lower search limit of an available bandwidth is defined as a packet size of the first estimation packet in a packet train ÷ a packet transmission interval and is assumed to be 0.1 Mbps in this case. An upper search limit of an available bandwidth is defined as a packet size of the last estimation packet in a packet train ÷ a packet transmission interval and is assumed to be 1.0 Mbps in this case.

When a true value of the available bandwidth is 0.8 Mbps, the true value falls within the search range (0.1 to 1.0 Mbps) of the packet train, and therefore highly accurate estimation can be performed. However, when considering a case of a number of transmitted packets being decreased from 10 to 4, the upper search limit becomes 0.4 Mbps, and therefore the true value does not fall within the search range (0.1 to 0.4 Mbps) of the packet train, thus highly accurate estimation cannot be performed.

An object of the present invention is to provide a transmission device, an available bandwidth estimation device, an available bandwidth estimation system, a method, and a recording medium being capable of reducing a communication load while maintaining estimation accuracy of available bandwidth estimation being high.

Solution to Problem

For settling the above-mentioned problem, a transmission device of the present invention comprises: a transmission means for transmitting estimation packets, a packet size of each of which successively increases, to an available bandwidth estimation device at equal intervals, and a transmission stop means for stopping the transmission of the estimation packets when receiving a signal indicating that a reception interval between the estimation packets at the available bandwidth estimation device starts to increase.

And, an available bandwidth estimation device of the present invention comprises: a reception means for receiving estimation packets which are transmitted by a transmission device at equal intervals, and a packet size of each of which successively increases, and an available bandwidth estimation means for, when the transmission of the estimation packets stops, estimating an available bandwidth, based on the estimation packets received up until then.

And, a transmission method of the present invention comprises: transmitting estimation packets, a packet size of each of which successively increases, to an available bandwidth estimation device at equal intervals, and, when receiving a signal indicating that a reception interval between the estimation packets at the available bandwidth estimation device starts to increase, stopping the transmission of the estimation packets.

And, an available bandwidth estimation method of the present invention comprises: receiving estimation packets which are transmitted by a transmission device at equal intervals, and a packet size of each of which successively increases, and, estimating an available bandwidth, when the transmission of the estimation packets stops, based on the estimation packets received up until then.

And, a non-transitory computer readable recording medium is recorded with a transmission program of the present invention, the program causing a computer to execute: a transmission function of transmitting estimation packets, a packet size of each of which successively increases, to an available bandwidth estimation device at equal intervals, and a transmission stop function of stopping the transmission of the estimation packets when receiving a signal indicating that a reception interval between the estimation packets at the available bandwidth estimation device starts to increase.

And, a non-transitory computer readable recording medium is recorded with an available bandwidth estimation program of the present invention, the program causing a computer to execute: a reception function of receiving estimation packets which are transmitted by a transmission device at equal intervals, and a packet size of each of which successively increases, and an available bandwidth estimation function of, when the transmission of the estimation packets stops, estimating an available bandwidth, based on the estimation packets received up until then.

Advantageous Effects of Invention

A transmission device, an available bandwidth estimation device, an available bandwidth estimation system, a method, and a recording medium, according to the present invention, is able to reduce a communication load while maintaining estimation accuracy of available bandwidth estimation being high.

EXAMPLE EMBODIMENT

First Example Embodiment

A first example embodiment of the present invention is described.

Figure 1:
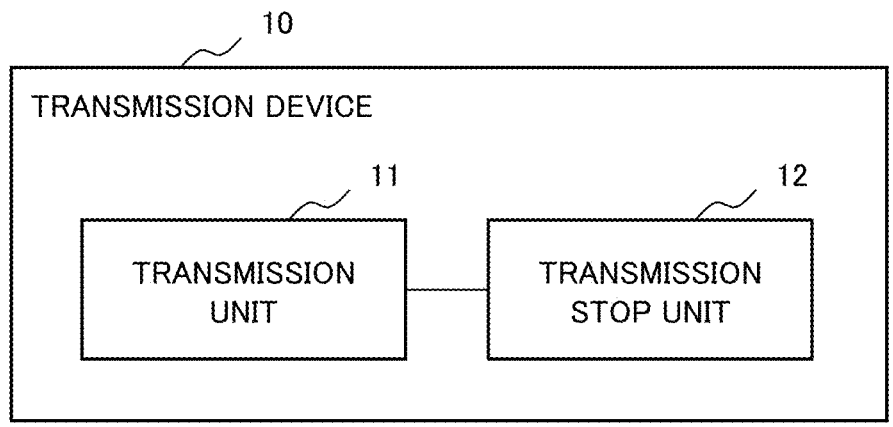
FIG. 1 shows a diagram illustrating a configuration example of a transmission device according to a first example embodiment of the present invention.

FIG. 1 illustrates a configuration example of a transmission device 10 according to the present example embodiment.

The transmission device 10 according to the present example embodiment includes a transmission unit 11 and a transmission stop unit 12.

The transmission unit 11 is a part transmitting estimation packets, a packet size of each of which successively increases, to an available bandwidth estimation device at equal intervals. The transmission stop unit 12 is a part stopping transmission of estimation packets when receiving a signal indicating that a reception interval between estimation packets at the available bandwidth estimation device starts to increase.

By thus configuring the transmission device 10, the transmission device 10 stops transmission of estimation packets when receiving a signal indicating that a reception interval between estimation packets starts to increase. When a reception interval between estimation packets starts to increase, a true value of an available bandwidth falls within a search range of the available bandwidth estimated by the available bandwidth estimation device, and therefore a communication load can be reduced by stopping transmission of estimation packets by the transmission device 10 from then onward. Further, by stopping transmission of estimation packets by the transmission device 10 after the true value of the available bandwidth falls within the search range of the available bandwidth, accuracy of the available bandwidth estimated by the available bandwidth estimation device can be maintained high. Accordingly, a communication load can be reduced while maintaining estimation accuracy of available bandwidth estimation high.

Figure 2:
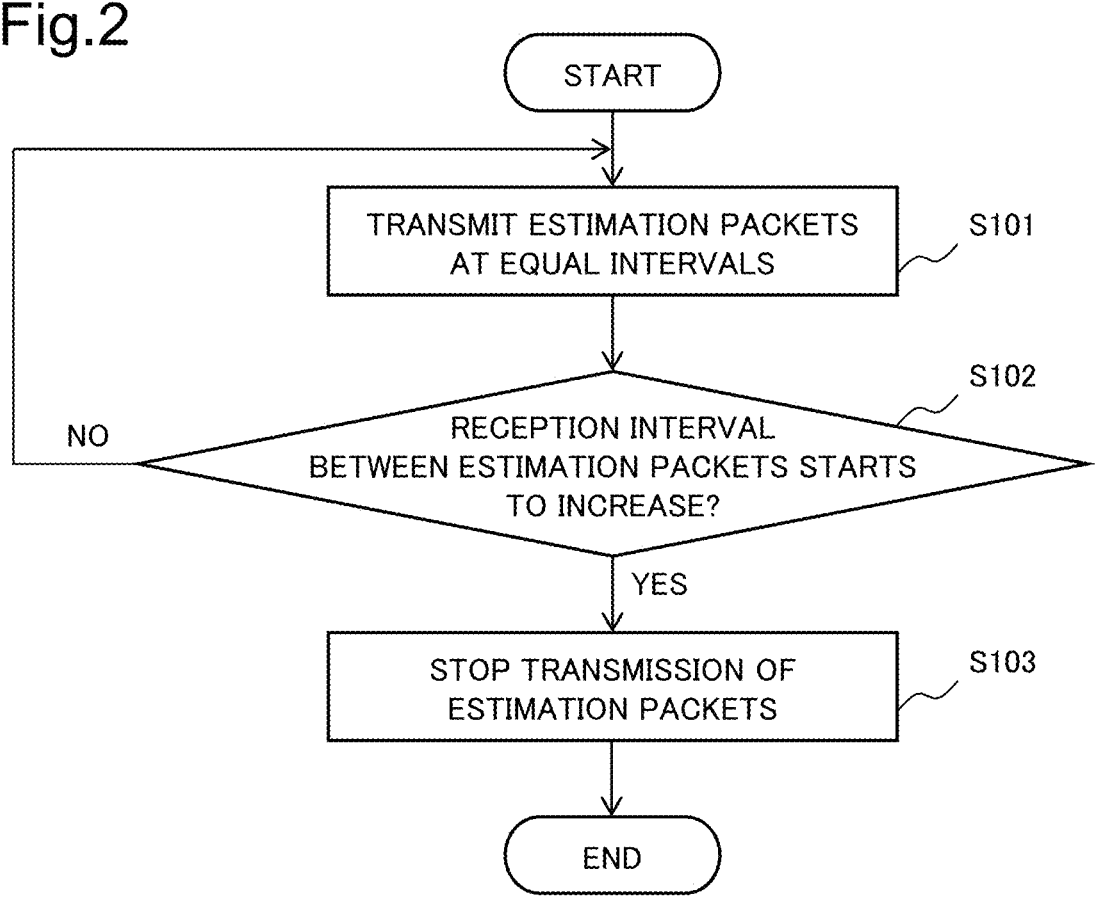
FIG. 2 shows a diagram illustrating an operation example of the transmission device according to the first example embodiment of the present invention.

Next, FIG. 2 illustrates an operation example of the transmission device 10 according to the present example embodiment.

The transmission unit 11 transmits estimation packets, a packet size of each of which successively increases, to the available bandwidth estimation device at equal intervals (Step S101). When receiving a signal indicating that a reception interval between estimation packets at the available bandwidth estimation device starts to increase (YES in Step S102), the transmission stop unit 12 stops transmission of estimation packets (Step S103).

By thus operating, the transmission device 10 stops transmission of estimation packets when receiving a signal indicating that a reception interval between estimation packets starts to increase. Accordingly, a communication load can be reduced while maintaining estimation accuracy of available bandwidth estimation high.

As described above, according to the first example embodiment of the present invention, the transmission device 10 stops transmission of estimation packets when receiving a signal indicating that a reception interval between estimation packets starts to increase. When a reception interval between estimation packets starts to increase, a true value of an available bandwidth falls within a search range of the available bandwidth estimated by the available bandwidth estimation device, and therefore a communication load can be reduced by stopping transmission of estimation packets by the transmission device 10 from then onward. Further, by stopping transmission of estimation packets by the transmission device 10 after the true value of the available bandwidth falls within the search range of the available bandwidth, accuracy of the available bandwidth estimated by the available bandwidth estimation device can be maintained high. Accordingly, a communication load can be reduced while maintaining estimation accuracy of available bandwidth estimation high.

Second Example Embodiment

Next, a second example embodiment of the present invention is described. The present example embodiment is configured to determine that a reception interval between estimation packets starts to increase by an available bandwidth estimation device 30.

Figure 3:
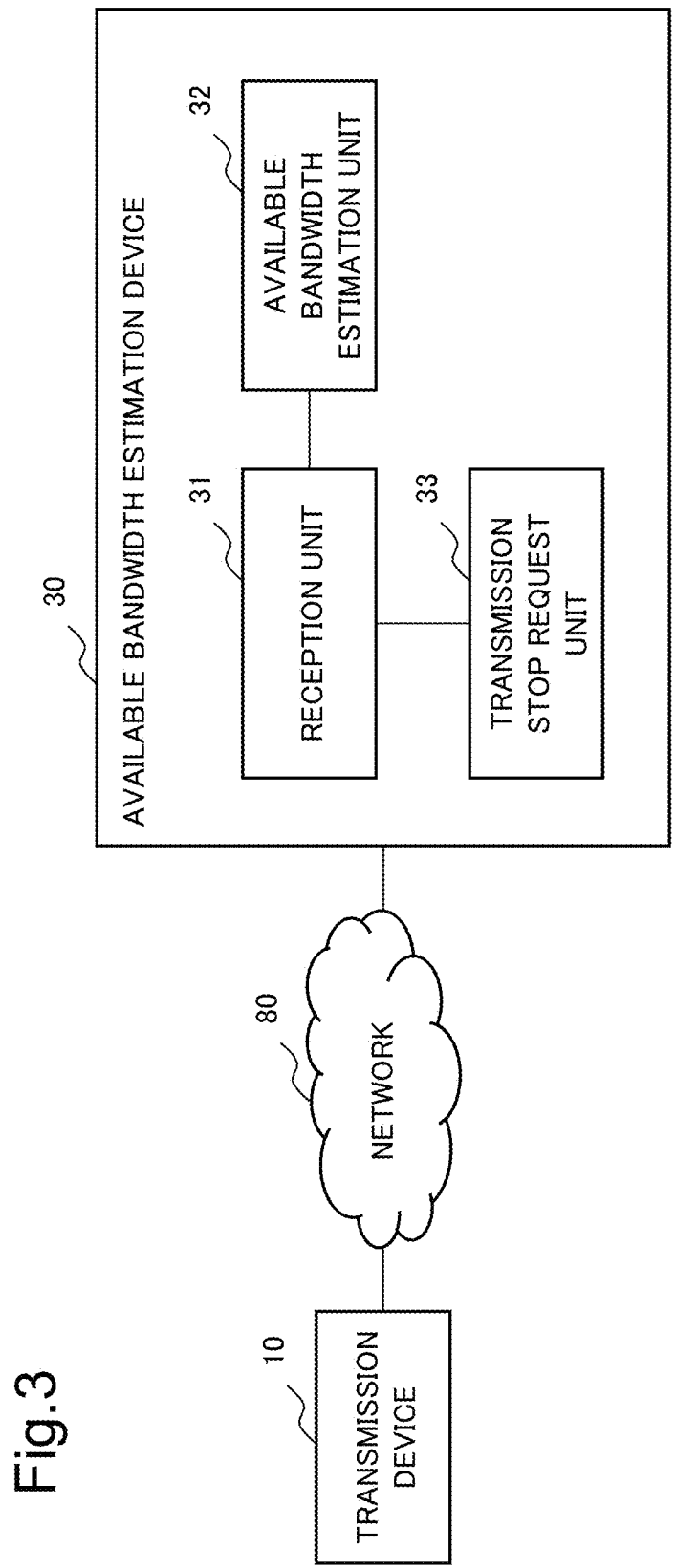
FIG. 3 shows a diagram illustrating a configuration example of an available bandwidth estimation system according to a second example embodiment of the present invention.

First, FIG. 3 illustrates a configuration example of an available bandwidth estimation system according to the present example embodiment.

The available bandwidth estimation system according to the present example embodiment includes a transmission device 10 and the available bandwidth estimation device 30.

The transmission device 10 and the available bandwidth estimation device 30 are connected to a network 80. The network 80 may be connected to devices other than the transmission device 10 and the available bandwidth estimation device 30, and cross traffic may flow between the other devices.

The transmission device 10 is a transmitting-side device of a packet train. Further, the available bandwidth estimation device 30 is a receiving-side device of a packet train and is a device estimating an available bandwidth.

Further, the transmission device 10 and the available bandwidth estimation device 30 are devices having a function of exchanging information with the outside. For example, each of the transmission device 10 and the available bandwidth estimation device 30 is a personal computer (PC), a mobile computer (personal digital assistant [PDA]), a mobile phone, a smartphone, a tablet terminal, a fixed-line phone, an on-the-street multimedia terminal, an onboard terminal, a network-connectable television, a network-connectable set-top box, a game machine, a network-connectable printer, or a network-connectable scanner.

Next, a configuration example of the available bandwidth estimation device 30 is described by use of FIG. 3.

The available bandwidth estimation device 30 includes a reception unit 31, an available bandwidth estimation unit 32, and a transmission stop request unit 33.

The reception unit 31 is a part receiving a packet train transmitted by the transmission device 10. A packet train is a chunk of estimation packets for available bandwidth estimation, a packet size of each estimation packet successively increasing. Estimation packets are transmitted by the transmission device 10 at equal intervals.

The available bandwidth estimation unit 32 is a part estimating an available bandwidth, based on estimation packets received up until transmission of estimation packets is stopped.

The transmission stop request unit 33 is a part requesting the transmission device 10 to stop transmission of estimation packets when a reception interval between estimation packets starts to increase.

For example, the transmission stop request unit 33 determines that a reception interval between estimation packets starts to increase when a reception interval between a received estimation packet and an estimation packet received last is greater than a reception interval between an estimation packet received second to last and the estimation packet received last.

Estimation packets are transmitted from the transmission device 10 at equal intervals. Accordingly, reception intervals are almost equal as long as there is no queuing delay, and a reception interval increases when a queuing delay occurs. When the available bandwidth estimation device 30 receives estimation packets up to occurrence of a queuing delay, a true value of an available bandwidth falls within a search range of the available bandwidth, and therefore reception of estimation packets on and after the occurrence of the queuing delay is not required. Accordingly, the transmission stop request unit 33 requests the transmission device 10 to stop transmission of estimation packets when determining that a reception interval between estimation packets starts to increase. Further, the available bandwidth estimation unit 32 estimates an available bandwidth, based on estimation packets received up until a reception interval starts to increase.

Next, a configuration example of the transmission device 10 is described by use of FIG. 1. The transmission device 10 includes a transmission unit 11 and a transmission stop unit 12.

The transmission unit 11 is a part transmitting a packet train to the available bandwidth estimation device 30. A packet train is a chunk of estimation packets for available bandwidth estimation, a packet size of each estimation packet successively increasing. The transmission unit 11 transmits estimation packets at equal intervals.

The transmission stop unit 12 is a part stopping transmission of estimation packets when receiving a signal indicating that a reception interval between estimation packets at the available bandwidth estimation device 30 starts to increase.

The transmission stop request unit 33 in the available bandwidth estimation device 30 according to the present example embodiment requests the transmission device 10 to stop transmission of estimation packets when a reception interval between estimation packets starts to increase. Accordingly, the transmission stop unit 12 in the transmission device 10 according to the present example embodiment stops transmission of estimation packets when being requested to stop transmission of estimation packets by the transmission device 10. In other words, a signal indicating that a reception interval between estimation packets starts to increase is a request from the transmission stop request unit 33 in the available bandwidth estimation device 30 for stopping transmission of estimation packets, according to the present example embodiment.

By thus configuring the transmission device 10, the transmission device 10 stops transmission of estimation packets when receiving a signal indicating that a reception interval between estimation packets starts to increase. When a reception interval between estimation packets starts to increase, a true value of an available bandwidth falls within a search range of the available bandwidth estimated by the available bandwidth estimation device 30, and therefore a communication load can be reduced by stopping transmission of estimation packets by the transmission device 10 from then onward. Further, by stopping transmission of estimation packets by the transmission device 10 after the true value of the available bandwidth falls within the search range of the available bandwidth, accuracy of the available bandwidth estimated by the available bandwidth estimation device 30 can be maintained high. Accordingly, a communication load can be reduced while maintaining estimation accuracy of available bandwidth estimation high.

Further, the available bandwidth estimation device 30 according to the present example embodiment can estimate an available bandwidth at a time point when a reception interval between estimation packets starts to increase. Accordingly, by the available bandwidth estimation device 30 transmitting an estimated value of the available bandwidth to the transmission device 10 immediately after the estimation, the estimated value can be conveyed to the transmission device 10 earlier compared with a case of estimating the available bandwidth after the entire packet train is received.

Further, by continuing transmission of estimation packets until a transmission stop request arrives from the available bandwidth estimation device 30, the transmission device 10 according to the present example embodiment can eliminate a need for previously fixing a number of estimation packets in a packet train.

Figure 4:
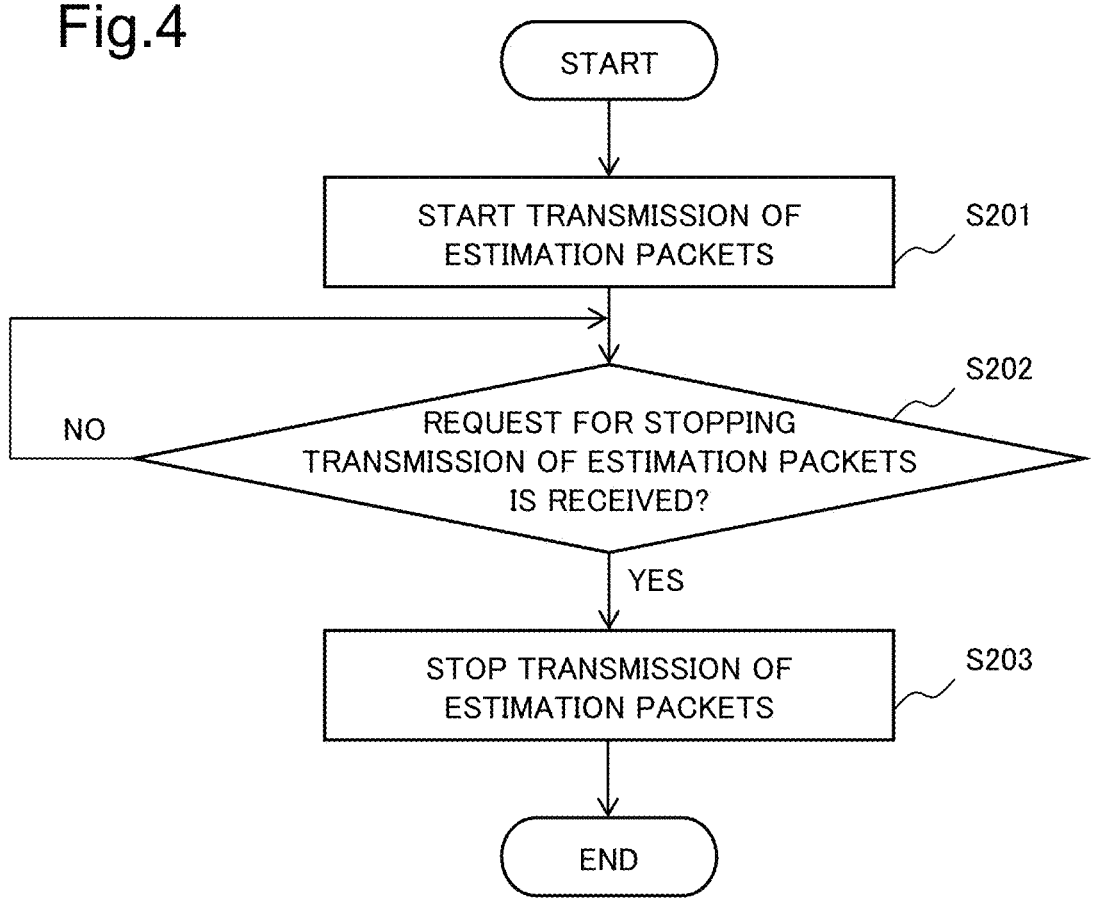
FIG. 4 shows a diagram illustrating an operation example of a transmission device according to the second example embodiment of the present invention.
Figure 5:
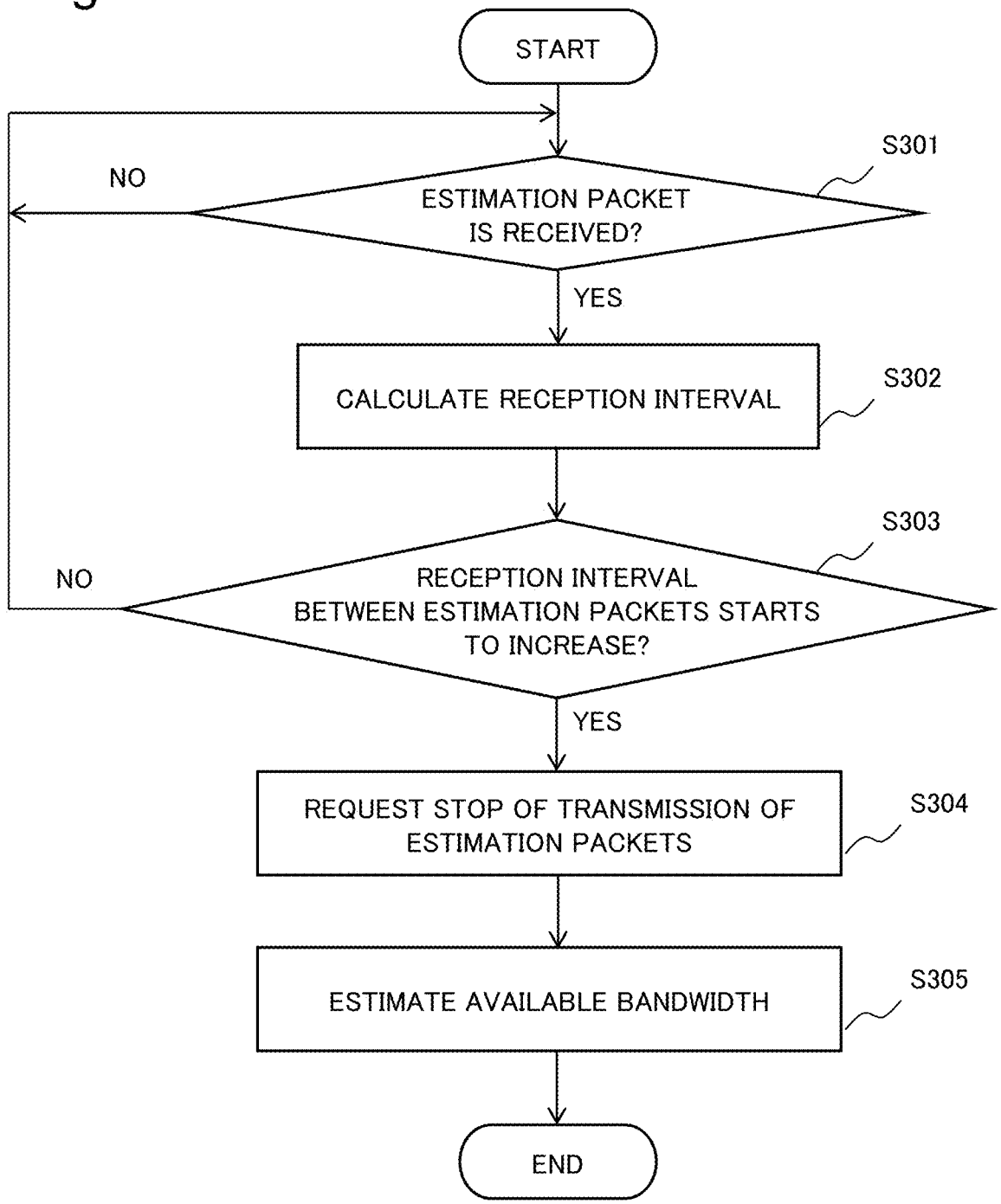
FIG. 5 shows a diagram illustrating an operation example of an available bandwidth estimation device according to the second example embodiment of the present invention.

Next, FIG. 4 illustrates an operation example of the transmission device 10 according to the present example embodiment, and FIG. 5 illustrates an operation example of the available bandwidth estimation device 30 according to the present example embodiment.

First, the transmission unit 11 in the transmission device 10 starts transmission of estimation packets (Step S201 in FIG. 4). The transmission unit 11 transmits estimation packets at equal intervals.

When the reception unit 31 in the available bandwidth estimation device 30 receives an estimation packet (YES in Step S301), the transmission stop request unit 33 calculates a reception interval between the estimation packet received this time and an estimation packet received last (Step S302).

Next, the transmission stop request unit 33 determines whether a reception interval between estimation packets starts to increase (Step S303). The transmission stop request unit 33 determines that a reception interval starts to increase when the reception interval between the estimation packet received this time and the estimation packet received last is greater than a reception interval between the estimation packet received last and an estimation packet received second to last.

When determining that a reception interval between estimation packets starts to increase (YES in Step S303), the transmission stop request unit 33 requests the transmission device 10 to stop transmission of estimation packets (Step S304). Then, the available bandwidth estimation unit 32 estimates an available bandwidth, based on estimation packets received up until then (Step S305). With regard to execution timings of Step S304 and Step S305, one may be executed before the other, or the two may be executed simultaneously.

When receiving a request for stopping transmission of estimation packets from the available bandwidth estimation device 30 (YES in Step S202 in FIG. 4), the transmission stop unit 12 in the transmission device 10 stops transmission of estimation packets by the transmission unit 11 (Step S203).

Figure 6:
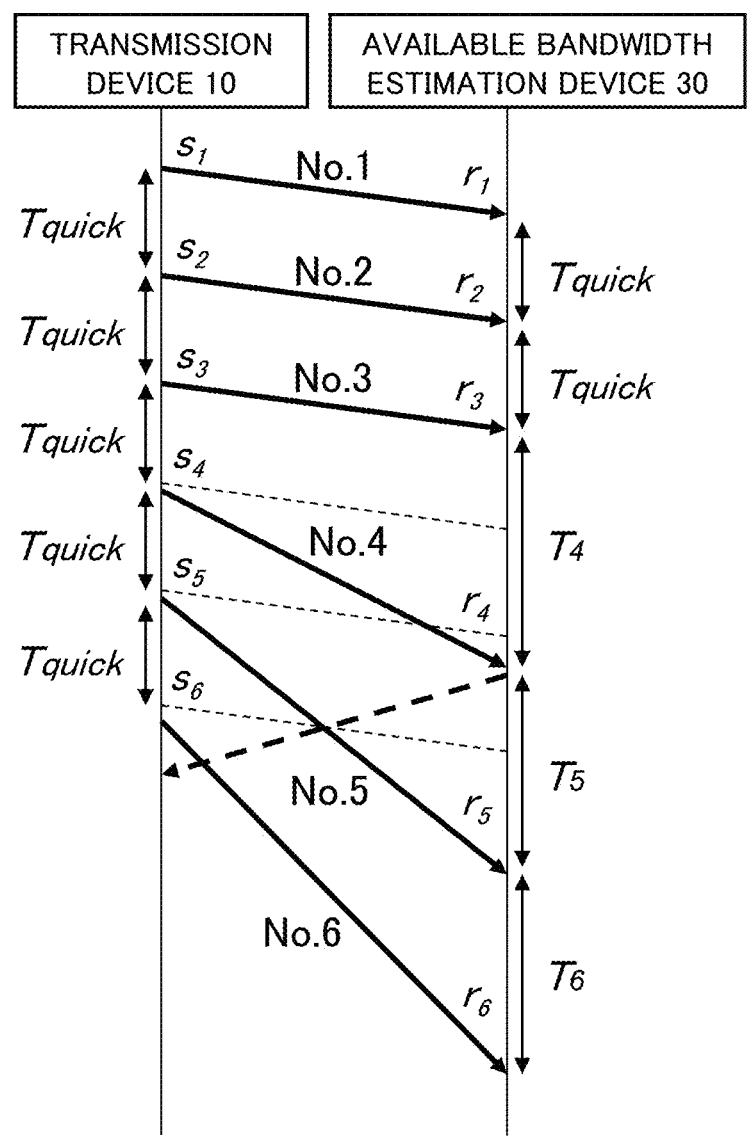
FIG. 6 shows a diagram illustrating an example of transmission and reception of estimation packets according to the second example embodiment of the present invention.

FIG. 6 illustrates an example of transmission and reception of estimation packets. In the diagram, si denotes a time of transmission of the i-th estimation packet at the transmission device 10, ri denotes a time of reception of the i-th estimation packet at the available bandwidth estimation device 30, Tquick denotes a transmission interval between estimation packets, and Ti denotes a reception interval between the (i−1)-th estimation packet and the i-th estimation packet.

In this example, the available bandwidth estimation device 30 determines that a reception interval between estimation packets starts to increase when receiving the fourth estimation packet and requests the transmission device 10 to stop transmission of estimation packets (a dotted arrow). Then, the transmission device 10 stops transmission of estimation packets.

By thus operating, the transmission device 10 stops transmission of estimation packets when receiving a signal indicating that a reception interval between estimation packets starts to increase. Accordingly, a communication load can be reduced while maintaining estimation accuracy of available bandwidth estimation high.

As described above, when receiving a signal indicating that a reception interval between estimation packets starts to increase, the transmission device 10 stops transmission of estimation packets, according to the second example embodiment of the present invention. When a reception interval between estimation packets starts to increase, a true value of an available bandwidth falls within a search range of the available bandwidth estimated by the available bandwidth estimation device 30, and therefore a communication load can be reduced by stopping transmission of estimation packets by the transmission device 10 from then onward. Further, by stopping transmission of estimation packets by the transmission device 10 after the true value of the available bandwidth falls within the search range of the available bandwidth, accuracy of the available bandwidth estimated by the available bandwidth estimation device 30 can be maintained high. Accordingly, a communication load can be reduced while maintaining estimation accuracy of available bandwidth estimation high.

For example, application examples of the available bandwidth estimation method according to the present example embodiment include congestion avoidance. For example, when data are collected from a large number of sensors through a narrowband wireless network at a plant, a warehouse, an airport, or a harbor, a data transmission cycle (and an amount of transmission data) from the sensors is adjusted based on an available bandwidth. Consequently, congestion can be avoided even when there are a large number of sensors.

Third Example Embodiment

Next, a third example embodiment of the present invention is described. The present example embodiment is configured to determine that a reception interval between estimation packets starts to increase by a transmission device 20.

Figure 7:
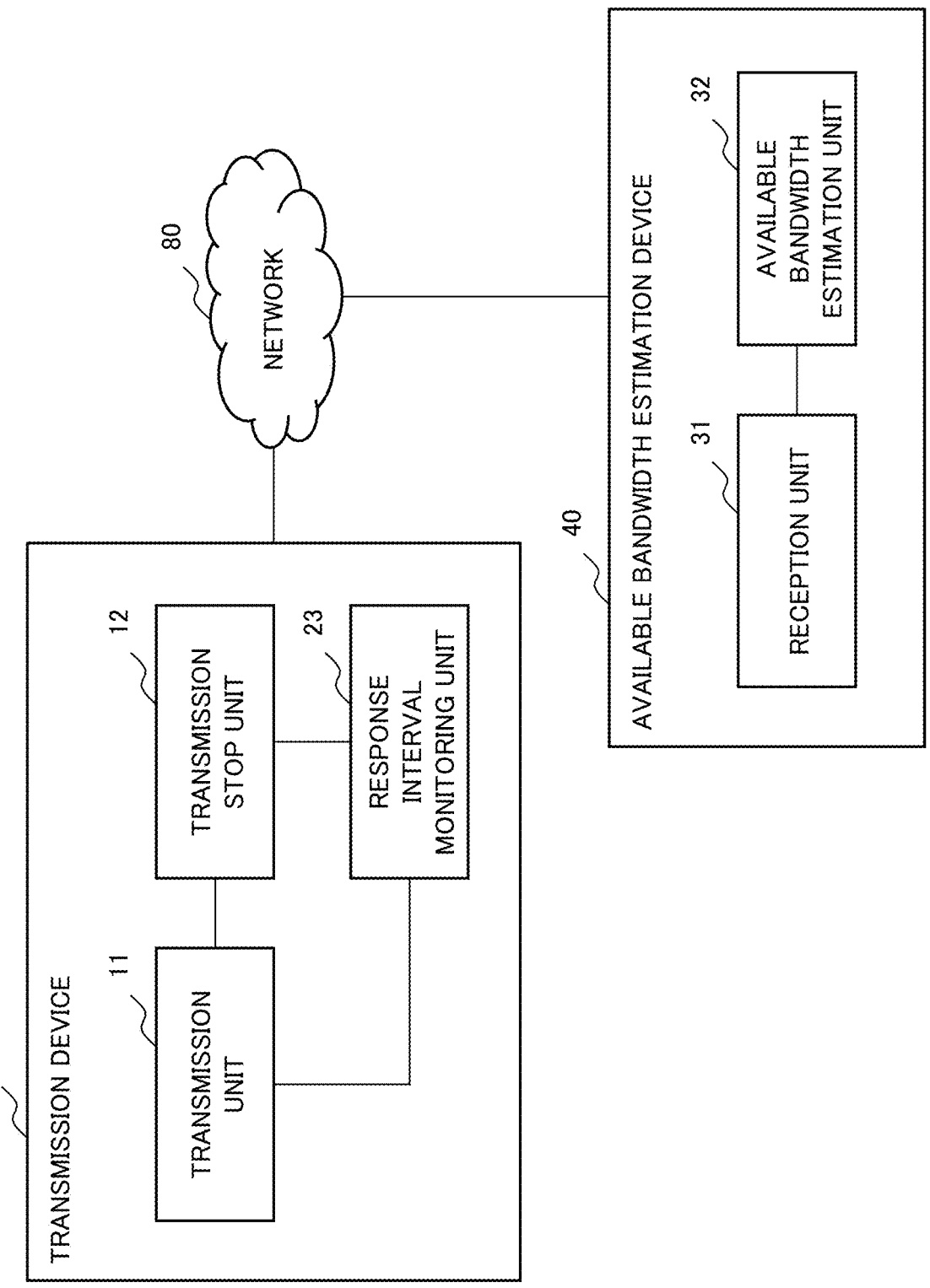
FIG. 7 shows a diagram illustrating a configuration example of an available bandwidth estimation system according to a third example embodiment of the present invention.

First, FIG. 7 illustrates a configuration example of an available bandwidth estimation system according to the present example embodiment.

The available bandwidth estimation system according to the present example embodiment includes the transmission device 20 and an available bandwidth estimation device 40. The transmission device 20 and the available bandwidth estimation device 40 are connected to a network 80.

Next, a configuration example of the available bandwidth estimation device 40 according to the present example embodiment is described by use of FIG. 7. The available bandwidth estimation device 40 according to the present example embodiment includes a reception unit 31 and an available bandwidth estimation unit 32. The configuration is acquired by removing the transmission stop request unit 33 from the configuration example (FIG. 3) of the available bandwidth estimation device 30 according to the second example embodiment.

The reception unit 31 is a part receiving a packet train transmitted by the transmission device 20. Estimation packets in a packet train are transmitted by the transmission device 20 at equal intervals.

Further, when receiving an estimation packet, the reception unit 31 according to the present example embodiment returns a response packet to the transmission device 20. At this time, a communication load due to response packets can be sufficiently lightened by setting a packet size of a response packet sufficiently small.

The available bandwidth estimation unit 32 is a part estimating an available bandwidth when transmission of estimation packets is stopped, based on estimation packets received up until then.

The available bandwidth estimation unit 32 according to the present example embodiment detects that transmission of estimation packets stops by a notification from the transmission device 20. Alternatively, the available bandwidth estimation unit 32 may determine that transmission of estimation packets is stopped when an estimation packet is not received for a predetermined period.

Next, a configuration example of the transmission device 20 according to the present example embodiment is described by use of FIG. 7. The transmission device 20 according to the present example embodiment includes a transmission unit 11, a transmission stop unit 12, and a response interval monitoring unit 23. The configuration is acquired by adding the response interval monitoring unit 23 to the configuration example of the transmission device 10 (FIG. 1) according to the first and second example embodiments.

The transmission unit 11 is a part transmitting a packet train to the available bandwidth estimation device 40. The transmission unit 11 transmits estimation packets in a packet train at equal intervals.

The transmission stop unit 12 is a part stopping transmission of estimation packets when receiving a signal indicating that a reception interval between estimation packets at the available bandwidth estimation device 40 starts to increase. Further, when stopping transmission of estimation packets, the transmission stop unit 12 may notify the available bandwidth estimation device 40 of the stop of the transmission.

The response interval monitoring unit 23 is a part monitoring a reception interval between response packets (hereinafter referred to as a response interval) responding to estimation packets received from the available bandwidth estimation device 40 and when a response interval starts to increase, outputting a notification indicating that a response interval starts to increase. The response interval monitoring unit 23 outputs a notification indicating that a response interval starts to increase to the transmission stop unit 12. Further, the response interval monitoring unit 23 may notify the available bandwidth estimation device 40 of a notification that a response interval starts to increase.

For example, the response interval monitoring unit 23 determines that a response interval between response packets starts to increase when a response interval between a received response packet and a response packet received last is greater than a response interval between a response packet received second to last and the response packet received last.

When a reception interval between estimation packets at the available bandwidth estimation device 40 starts to increase, a response interval between response packets returned to the transmission device 20 by the available bandwidth estimation device 40 also starts to increase. Accordingly, when the response interval monitoring unit 23 outputs a notification indicating that a response interval starts to increase, the transmission stop unit 12 stops transmission of estimation packets, according to the present example embodiment. In other words, a signal indicating that a reception interval between estimation packets starts to increase is a notification indicating that a response interval between response packets starts to increase, according to the present example embodiment.

By thus configuring the transmission device 20, the transmission device 20 stops transmission of estimation packets when receiving a signal indicating that a reception interval between estimation packets starts to increase. When a reception interval between estimation packets starts to increase, a true value of an available bandwidth falls within a search range of the available bandwidth estimated by the available bandwidth estimation device 40, and therefore a communication load can be reduced by stopping transmission of estimation packets by the transmission device 20 from then onward. Further, by stopping transmission of estimation packets by the transmission device 20 after the true value of the available bandwidth falls within the search range of the available bandwidth, accuracy of the available bandwidth estimated by the available bandwidth estimation device 40 can be maintained high. Accordingly, a communication load can be reduced while maintaining estimation accuracy of available bandwidth estimation high.

Further, the available bandwidth estimation device 40 according to the present example embodiment can estimate an available bandwidth at a time point when a reception interval between estimation packets starts to increase. Accordingly, by the available bandwidth estimation device 40 transmitting an estimated value of the available bandwidth to the transmission device 20 immediately after the estimation, the estimated value can be conveyed to the transmission device 20 earlier compared with a case of estimating the available bandwidth after the entire packet train is received.

Further, by continuing transmission of estimation packets until a response interval between response packets starts to increase, the transmission device 20 according to the present example embodiment can eliminate a need for previously fixing a number of estimation packets in a packet train.

Figure 8:
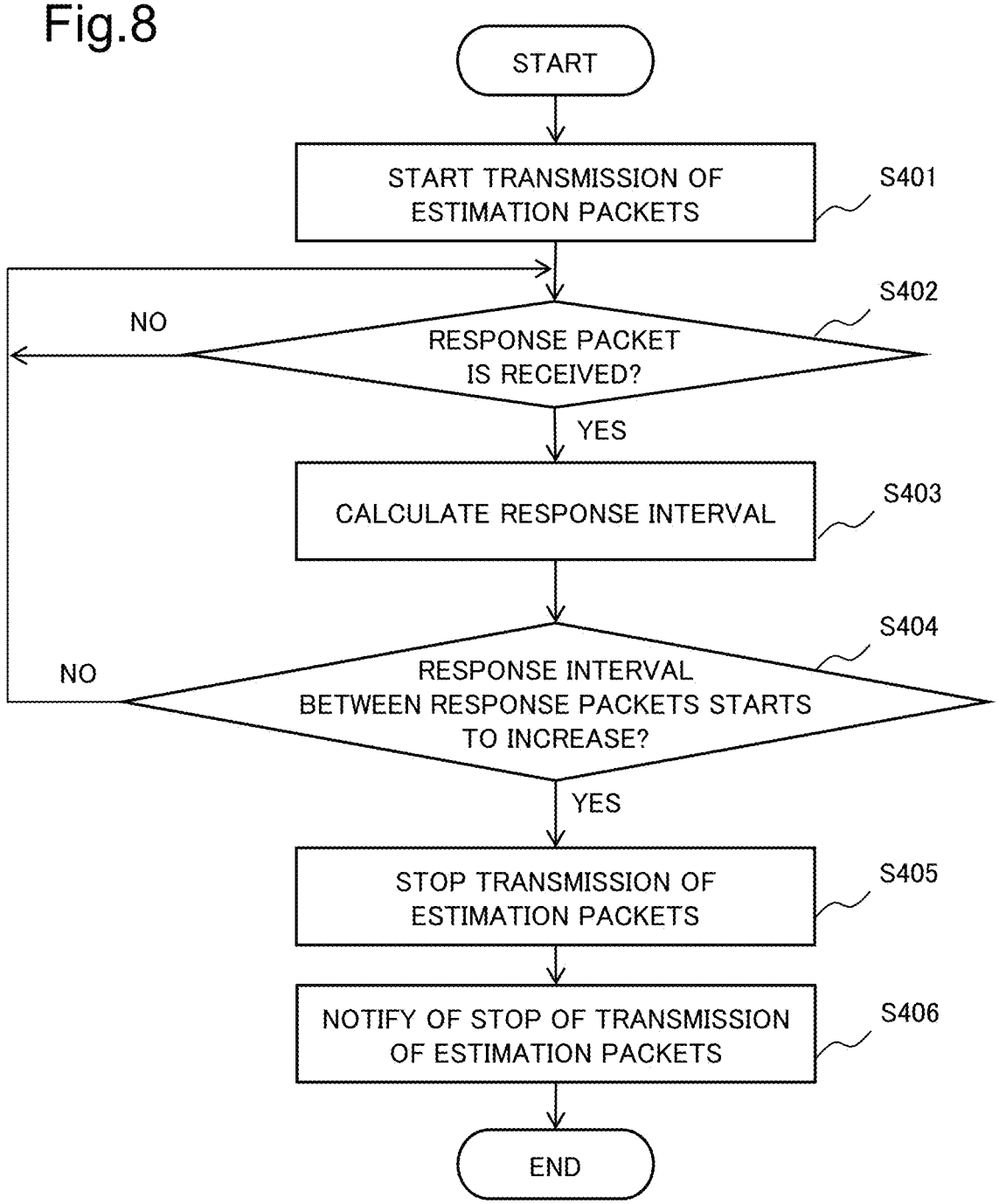
FIG. 8 shows a diagram illustrating an operation example of a transmission device according to the third example embodiment of the present invention.
Figure 9:
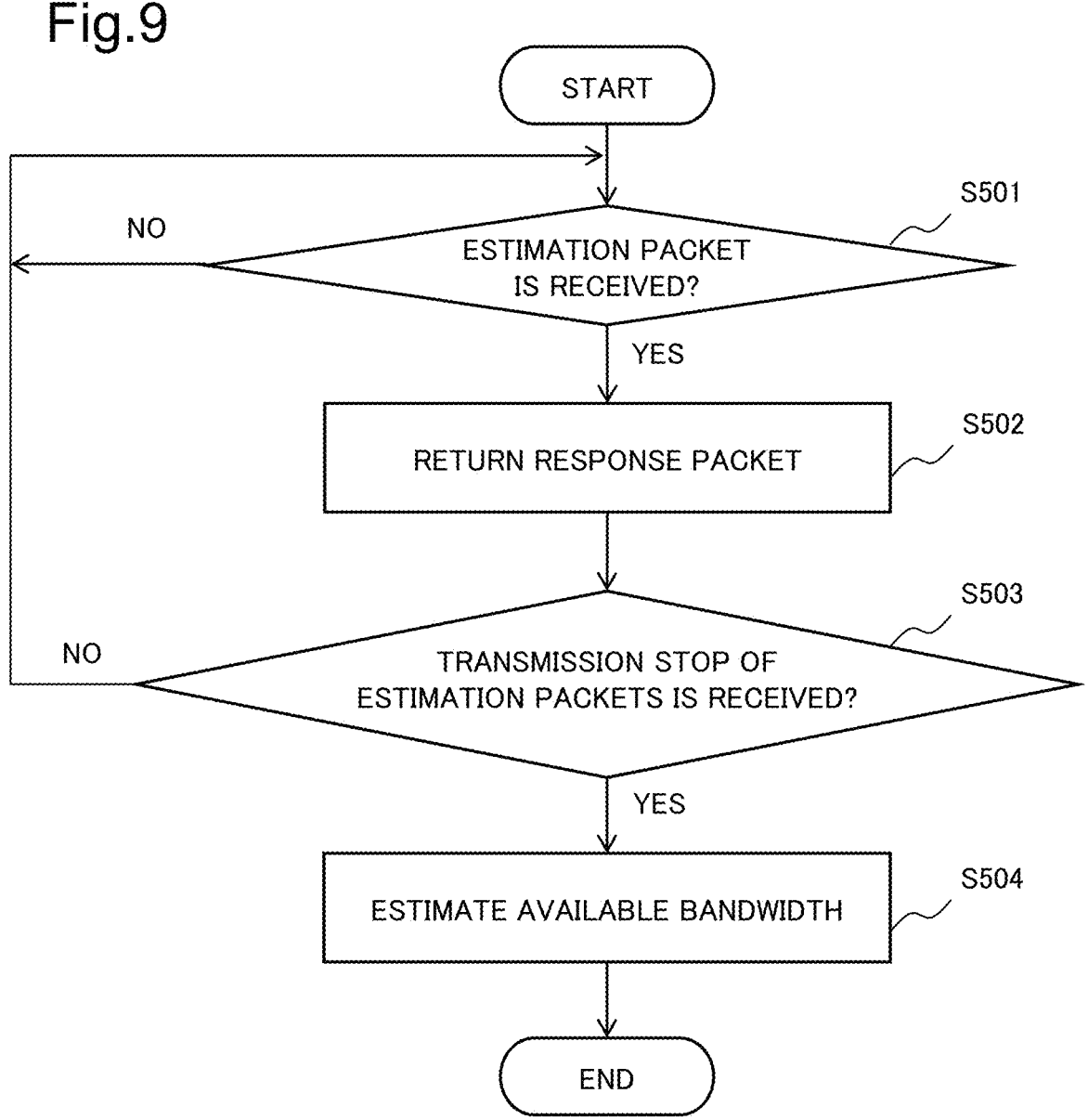
FIG. 9 shows a diagram illustrating an operation example of an available bandwidth estimation device according to the third example embodiment of the present invention.

Next, FIG. 8 illustrates an operation example of the transmission device 20 according to the present example embodiment, and FIG. 9 illustrates an operation example of the available bandwidth estimation device 40 according to the present example embodiment.

First, the transmission device 20 starts transmission of estimation packets (Step S401 in FIG. 8). The transmission device 20 transmits estimation packets at equal intervals.

When receiving an estimation packet (YES in Step S501 in FIG. 9), the available bandwidth estimation device 40 returns a response packet to the transmission device 20 (Step S502). By changing Step S501 and Step S502 in such a way that the available bandwidth estimation device 40 returns a response packet every time a predetermined number of estimation packets are received, a communication load due to response packets can be further reduced.

When receiving a response packet (YES in Step S402 in FIG. 8), the transmission device 20 calculates a response interval between the response packet received this time and a response packet received last (Step S403).

Next, the transmission device 20 determines whether a response interval between response packets starts to increase (Step S404). The transmission device 20 determines that a response interval starts to increase when the response interval between the response packet received this time and the response packet received last is greater than a response interval between the response packet received last and a response packet received second to last.

When determining that a response interval between response packets starts to increase (YES in Step S404), the transmission device 20 stops transmission of estimation packets (Step S405) and notifies the available bandwidth estimation device 40 of the stop of the transmission of estimation packets (Step S406). With regard to execution timings of Step S405 and Step S406, one may be executed before the other, or the two may be executed simultaneously.

When receiving the transmission stop of estimation packets (YES in Step S503 in FIG. 9), the available bandwidth estimation device 40 estimates an available bandwidth, based on estimation packets received up until then (Step S504).

Figure 10:
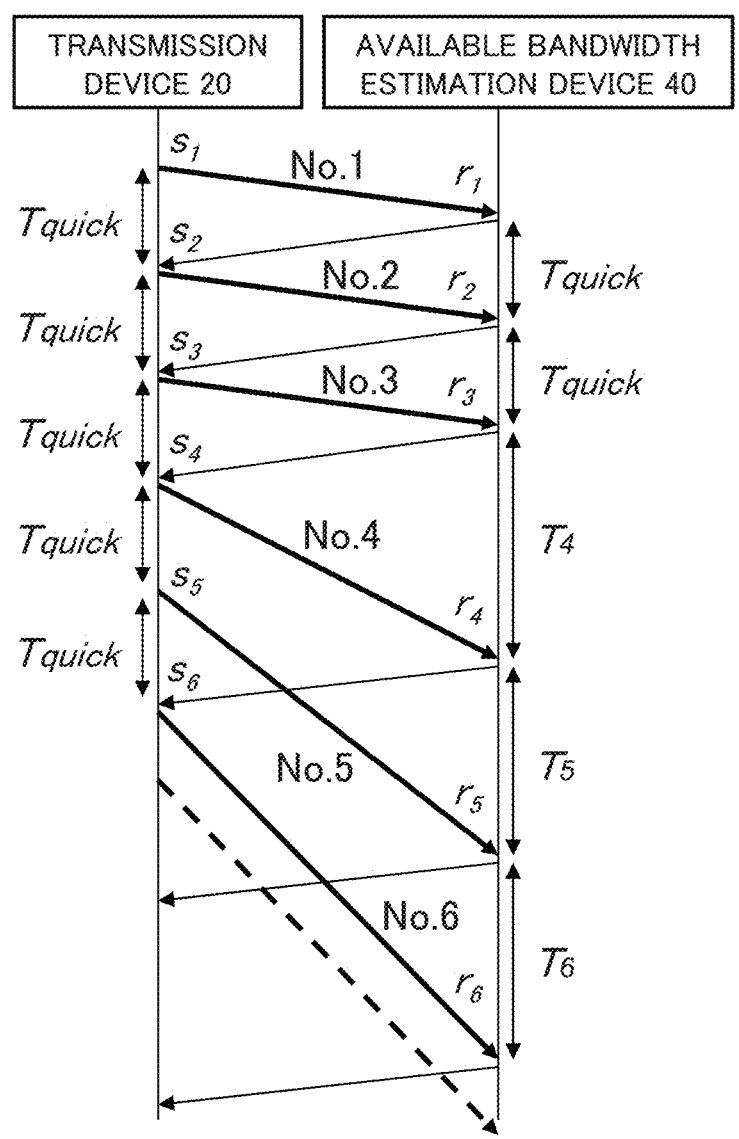
FIG. 10 shows a diagram illustrating an example of transmission of estimation packets and response packets, according to the third example embodiment of the present invention.

FIG. 10 illustrates an example of transmission and reception of estimation packets and response packets. In the diagram, si denotes a time of transmission of the i-th estimation packet at the transmission device 20, ri denotes a time of reception of the i-th estimation packet at the available bandwidth estimation device 40, Tquick denotes a transmission interval between estimation packets, and Ti denotes a reception interval between the (i−1)-th estimation packet and the i-th estimation packet. Further, a thick solid arrow represents transmission and reception of an estimation packet, and a thin solid arrow represents transmission and reception of a response packet.

In this example, when receiving the fourth response packet, the transmission device 20 determines that a response interval between response packets starts to increase and stops transmission of estimation packets. Further, the transmission device 20 notifies the available bandwidth estimation device 40 of the stop of the transmission of estimation packets (a thick dotted arrow).

By thus operating, the transmission device 20 stops transmission of estimation packets when receiving a signal indicating that a reception interval between estimation packets starts to increase. Accordingly, a communication load can be reduced while maintaining estimation accuracy of available bandwidth estimation high.

As described above, according to the third example embodiment of the present invention, the transmission device 20 stops transmission of estimation packets when receiving a signal indicating that a reception interval between estimation packets starts to increase. When a reception interval between estimation packets starts to increase, a true value of an available bandwidth falls within a search range of the available bandwidth estimated by the available bandwidth estimation device 40, and therefore a communication load can be reduced by stopping transmission of estimation packets by the transmission device 20 from then onward. Further, by stopping transmission of estimation packets by the transmission device 20 after the true value of the available bandwidth falls within the search range of the available bandwidth, accuracy of the available bandwidth estimated by the available bandwidth estimation device 40 can be maintained high. Accordingly, a communication load can be reduced while maintaining estimation accuracy of available bandwidth estimation high.

Further, the available bandwidth estimation device 40 according to the present example embodiment can estimate an available bandwidth at a time point when a reception interval between estimation packets starts to increase. Accordingly, by the available bandwidth estimation device 40 transmitting an estimated value of the available bandwidth to the transmission device 20 immediately after the estimation, the estimated value can be conveyed to the transmission device 20 earlier compared with a case of estimating the available bandwidth after the entire packet train is received.

Further, by continuing transmission of estimation packets until a response interval between response packets starts to increase, the transmission device 20 according to the present example embodiment can eliminate a need for previously fixing a number of estimation packets in a packet train.

Fourth Example Embodiment

Next, a fourth example embodiment of the present invention is described.

An unstable behavior such as a reception interval once starting to increase reverting to the original state may be exhibited in a wireless network with many fluctuation factors, or the like. Accordingly, the methods according to the second and third example embodiments may discontinue packet transmission before a true value of an available bandwidth falls within a search range. The present example embodiment is configured to take measures against the issue.

First, a configuration example of an available bandwidth estimation system according to the present example embodiment is described by use of FIG. 3.

The configuration example of the available bandwidth estimation system according to the present example embodiment is similar to that of the second example embodiment. According to the present example embodiment, an available bandwidth estimation device 30 detects that a reception interval between estimation packets starts to increase and requests a transmission device 10 to stop estimation packets, similarly to the second example embodiment.

The transmission device 10 according to the present example embodiment is similar to that according to the second example embodiment, and therefore description thereof is omitted.

By thus configuring the transmission device 10, the transmission device 10 stops transmission of estimation packets when receiving a signal indicating that a reception interval between estimation packets starts to increase. When a reception interval between estimation packets starts to increase, a true value of an available bandwidth falls within a search range of the available bandwidth estimated by the available bandwidth estimation device 30, and therefore a communication load can be reduced by stopping transmission of estimation packets by the transmission device 10 from then onward. Further, by stopping transmission of estimation packets by the transmission device 10 after the true value of the available bandwidth falls within the search range of the available bandwidth, accuracy of the available bandwidth estimated by the available bandwidth estimation device 30 can be maintained high. Accordingly, a communication load can be reduced while maintaining estimation accuracy of available bandwidth estimation high.

Next, a configuration example of the available bandwidth estimation device 30 according to the present example embodiment is described by use of FIG. 3. A reception unit 31 and an available bandwidth estimation unit 32 are similar to those according to the second example embodiment, and therefore description thereof is omitted.

A transmission stop request unit 33 is a part requesting the transmission device 10 to stop transmission of estimation packets when a reception interval between estimation packets starts to increase. The transmission stop request unit 33 according to the present example embodiment determines that a reception interval between estimation packets starts to increase by a method described below.

A queuing delay qi occurring in a network by transmission of a packet train may be expressed by equation 1.

$$q_i = (r_i - r_1) - (s_i - s_1) \quad \text{(equation 1)}$$

Note that $i=1, 2, \ldots, N$. Further, N denotes a number of estimation packets included in a packet train, qi denotes a queuing delay of the i-th estimation packet, ri denotes a time of reception of the i-th estimation packet at the available bandwidth estimation device 30, and si denotes a time of transmission of the i-th estimation packet at the transmission device 10. When a queuing delay occurs, that is, a reception interval starts to increase, at the k-th estimation packet, $qi=0$ at $i=1, 2, \ldots, k$, and $qi>0$ at $i=k+1, k+2, \ldots, N$.

Further, a behavior of a queuing delay when an ideal environment without any fluctuation factor is assumed (referred to as an ideal curve) may be expressed by, for example, equation 2 as is the case with NPL 1.

(equation 2)

$$q_i = 0, \qquad \text{if } i \le k \quad \text{(a)}$$

$$q_i = \frac{T_{quick}}{P_k}\left[P_i(i-k) + \frac{\Delta P}{2}\{i(i-1) - k(k-1)\}\right] - \qquad \text{(b)}$$
$$\{i - (k+1)\}T_{quick},$$

Note that Tquick denotes a transmission interval between estimation packets, Pk denotes a packet size of the k-th estimation packet, and ΔP denotes an increment of a packet size of an estimation packet when a packet number is advanced by one. Also, (a) in equation 2 means that a queuing delay forms a horizontal straight line at $i=1, 2, \ldots, k$, and (b) in equation 2 means that a queuing delay forms a parabola at $i=k+1, k+2, \ldots, N$.

Figure 11:
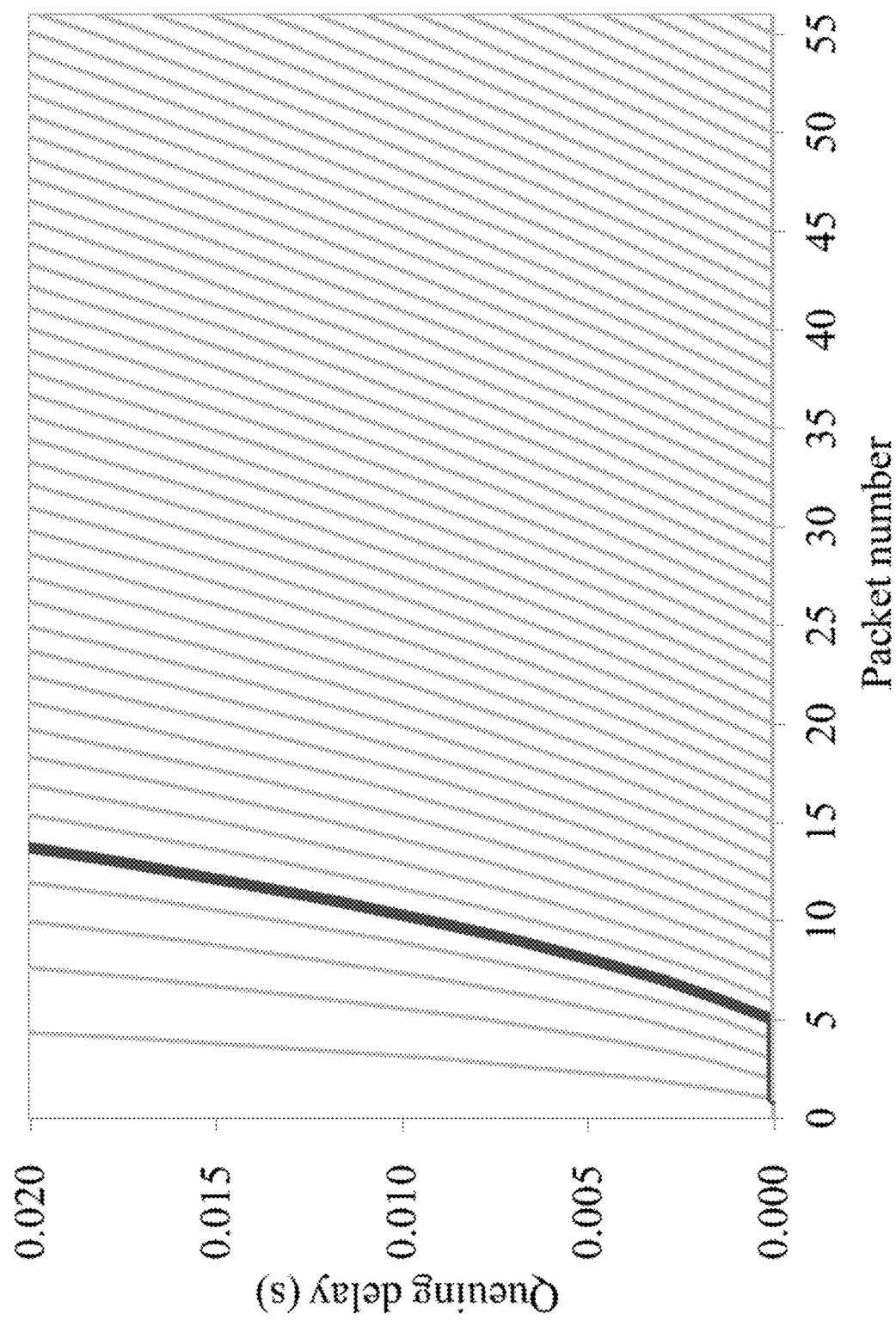
FIG. 11 shows a diagram illustrating an example of an ideal curve of a queuing delay according to a fourth example embodiment of the present invention.
Figure 12:
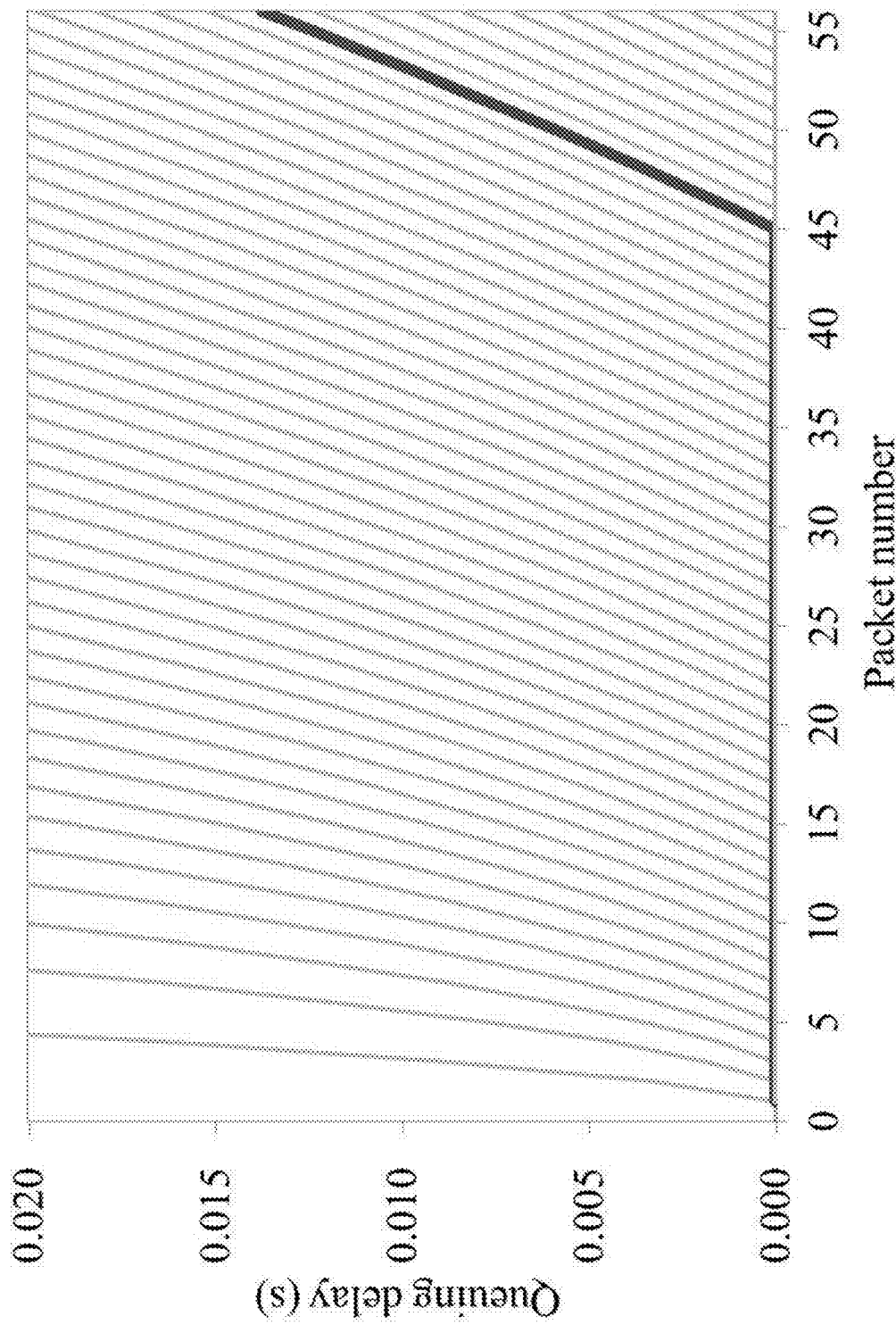
FIG. 12 shows a diagram illustrating an example of an ideal curve of a queuing delay according to the fourth example embodiment of the present invention.

FIG. 11 and FIG. 12 graph the ideal curves with the horizontal axis representing a packet number and the vertical axis representing a queuing delay. FIG. 11 shows an ideal curve in a case of a reception interval starting to increase near the beginning of a packet train, and an inclination of the parabola is steep. FIG. 12 shows an ideal curve in a case of a reception interval starting to increase near the end of the packet train, and an inclination of the parabola is gradual.

A queuing delay of a packet train actually observed in a wireless network with many fluctuation factors, or the like exhibits an unstable behavior such as a reception interval once starting to increase reverting to the original state. Accordingly, an actual queuing delay does not form a smooth shape like the ideal curves in FIG. 11 and FIG. 12, and has a jagged shape. Further, while having a jagged shape, an actual queuing delay as a whole has a shape close to a horizontal line from the beginning to a certain packet number and a shape having a trend close to a parabola from the packet number to the end.

The transmission stop request unit 33 according to the present example embodiment determines that a reception interval between estimation packets starts to increase, by use of the aforementioned ideal curve of a queuing delay.

More specifically, for example, the transmission stop request unit 33 determines that a reception interval between estimation packets increases when a reception interval between a received estimation packet and an estimation packet received last is greater than a reception interval between an estimation packet received second to last and the estimation packet received last. A packet number of the estimation packet at this time is denoted as a.

Further, when a reception interval between estimation packets increases, the transmission stop request unit 33 further receives a predetermined number of estimation packets. A packet number of the latest estimation packet at this time is denoted as b.

Next, the transmission stop request unit 33 calculates a queuing delay qb of an ideal curve by substituting a for k and b for i in equation 2. Then, when a difference between an actual queuing delay of an estimation packet with the packet number b and the queuing delay qb of the ideal curve is less than or equal to a predetermined value, the transmission stop request unit 33 determines that a reception interval between estimation packets starts to increase. The actual queuing delay may be calculated by equation 1.

Thus, the available bandwidth estimation device 30 according to the present example embodiment determines that a reception interval between estimation packets starts to increase, by use of a rising position a queuing delay and a degree of inclination of an ideal curve. Consequently, even when a shape of a queuing delay of an actually observed packet train is jagged, the available bandwidth estimation device 30 can more accurately determine whether or not the behavior has a trend in which a real queuing delay occurs.

Next, an operation example of the available bandwidth estimation system according to the present example embodiment is described.

An operation example of the transmission device 10 according to the present example embodiment is similar to that of the transmission device 10 according to the second example embodiment (FIG. 4), and therefore description thereof is omitted.

By thus operating, the transmission device 10 stops transmission of estimation packets when receiving a signal indicating that a reception interval between estimation packets starts to increase. Accordingly, a communication load can be reduced while maintaining estimation accuracy of available bandwidth estimation high.

Figure 13:
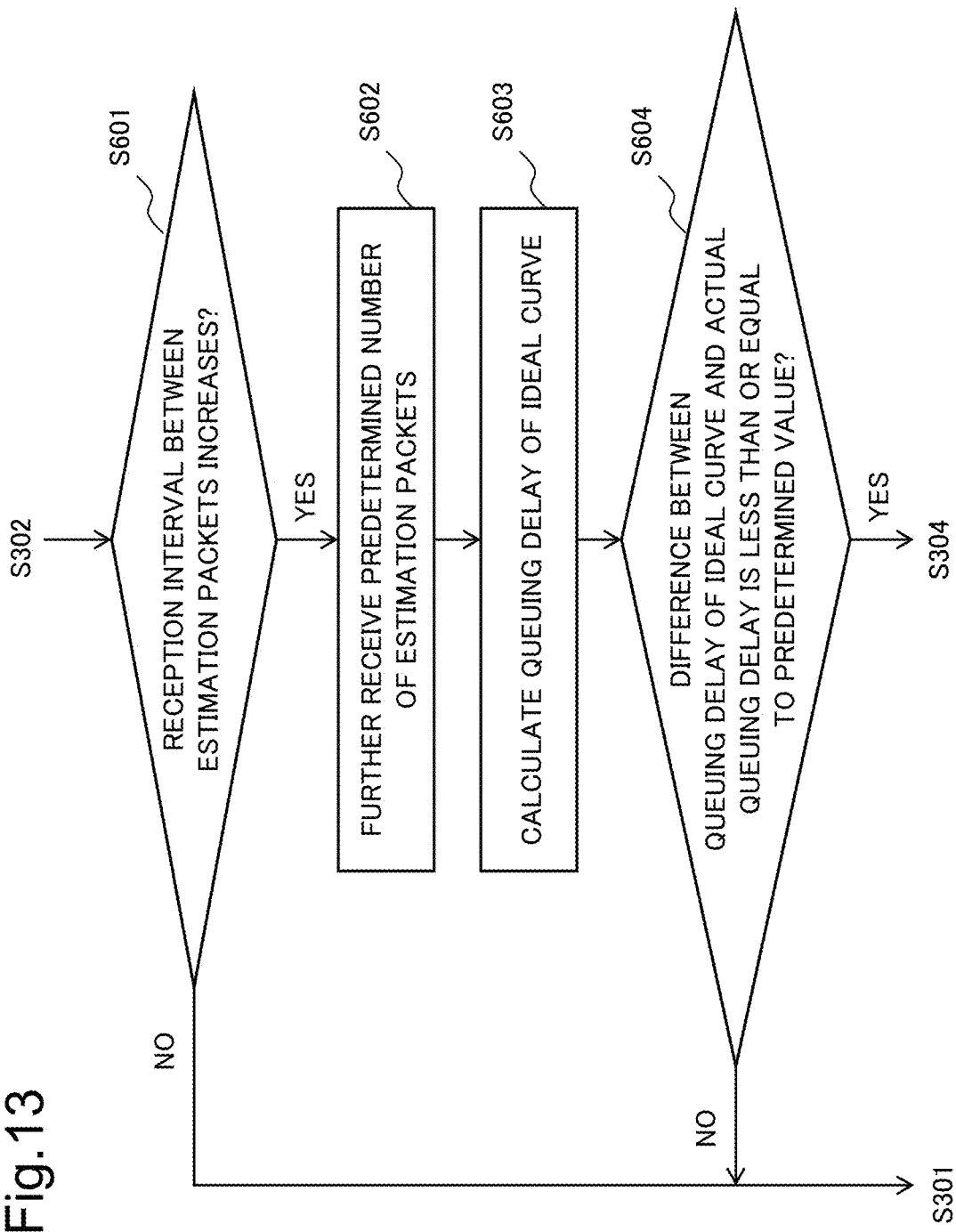
FIG. 13 shows a diagram illustrating an operation example of an available bandwidth estimation device according to the fourth example embodiment of the present invention.

Next, an operation example of the available bandwidth estimation device 30 according to the present example embodiment is described by use of FIG. 5 and FIG. 13. FIG. 13 shows an example of an operation executed in place of Step S303 in FIG. 5 by the available bandwidth estimation device 30.

First, the available bandwidth estimation device 30 executes Step S301 and Step S302 in FIG. 5. The operation is similar to that according to the second example embodiment, and therefore description thereof is omitted.

Next, the available bandwidth estimation device 30 determines whether a reception interval between estimation packets increases (Step S601). The available bandwidth estimation device 30 determines that a reception interval between estimation packets increases when a reception interval between a received estimation packet and an estimation packet received last is greater than a reception interval between an estimation packet received second to last and the estimation packet received last.

Further, when a reception interval between estimation packets increases (YES in Step S601), the available bandwidth estimation device 30 further receives a predetermined number of estimation packets (Step S602).

Next, based on equation 2, the available bandwidth estimation device 30 calculates a queuing delay on an ideal curve with respect to the latest estimation packet (Step S603). Then, when a difference between an actual queuing delay of the latest estimation packet and the queuing delay on the ideal curve is less than or equal to a predetermined value (YES in Step S604), the available bandwidth estimation device 30 determines that a reception interval between estimation packets starts to increase.

Next, when determining that a reception interval between estimation packets starts to increase (YES in Step S604), the available bandwidth estimation device 30 requests the transmission device 10 to stop transmission of estimation packets (Step S304 in FIG. 5). Then, the available bandwidth estimation device 30 estimates an available bandwidth (Step S305).

Thus, the available bandwidth estimation device 30 according to the present example embodiment determines that a reception interval between estimation packets starts to increase, by use of a rising position of a queuing delay and a degree of inclination of an ideal curve. Consequently, even when a shape of an actually observed queuing delay of a packet train is jagged, the available bandwidth estimation device 30 can more accurately determine whether or not the behavior has a trend in which a real queuing delay occurs.

As described above, according to the fourth example embodiment of the present invention, the transmission device 10 stops transmission of estimation packets when receiving a signal indicating that a reception interval between estimation packets starts to increase. When a reception interval between estimation packets starts to increase, a true value of an available bandwidth falls within a search range of the available bandwidth estimated by the available bandwidth estimation device 30, and therefore a communication load can be reduced by stopping transmission of estimation packets by the transmission device 10 from then onward. Further, by stopping transmission of estimation packets by the transmission device 10 after the true value of the available bandwidth falls within the search range of the available bandwidth, accuracy of the available bandwidth estimated by the available bandwidth estimation device 30 can be maintained high. Accordingly, a communication load can be reduced while maintaining estimation accuracy of available bandwidth estimation high.

Further, the available bandwidth estimation device 30 according to the present example embodiment determines that a reception interval between estimation packets starts to increase, by use of a rising position of a queuing delay and a degree of inclination of an ideal curve. Consequently, even when a shape of an actually observed queuing delay of a packet train is jagged, the available bandwidth estimation device 30 can more accurately determine whether or not the behavior has a trend in which a real queuing delay occurs.

Fifth Example Embodiment

Next, a fifth example embodiment of the present invention is described. A configuration of a transmission device 20 determining that a reception interval between estimation packets starts to increase, by use of an ideal curve, is described in the present example embodiment.

First, by use of FIG. 7, a configuration example of an available bandwidth estimation system according to the present example embodiment is described.

A configuration example of the available bandwidth estimation system according to the present example embodiment is similar to that according to the third example embodiment. According to the present example embodiment, the transmission device 20 detects that a reception interval between estimation packets (a response interval between response packets) starts to increase, and stops transmission of estimation packets, similarly to the third example embodiment.

Next, a configuration example of the transmission device 20 according to the present example embodiment is described by use of FIG. 7. An available bandwidth estimation device 40 is similar to that according to the third example embodiment, and therefore description thereof is omitted.

A transmission unit 11 and a transmission stop unit 12 are similar to those according to the third example embodiment, and therefore description thereof is omitted.

A response interval monitoring unit 23 is a part monitoring a response interval between response packets responding to estimation packets received from the available bandwidth estimation device 40, and when a response interval starts to increase, outputting a notification indicating that a response interval starts to increase.

The response interval monitoring unit 23 according to the present example embodiment determines that a response interval between response packets starts to increase, by use of an ideal curve of a queuing delay described in the fourth example embodiment.

More specifically, for example, the response interval monitoring unit 23 determines that a response interval between response packets increases when a response interval between a received response packet and a response packet received last is greater than a response interval between a response packet received second to last and the response packet received last. A packet number of the response packet at this time is denoted as a.

Further, when a response interval between response packets increases, the response interval monitoring unit 23 further receives a predetermined number of response packets. A packet number of the latest response packet at this time is denoted as b.

Next, the response interval monitoring unit 23 calculates a queuing delay qb of an ideal curve by substituting a for k and b for i in equation 2. Then, when a difference between an actual queuing delay of a response packet with the packet number b and the queuing delay qb of the ideal curve is less than or equal to a predetermined value, the response interval monitoring unit 23 determines that a response interval between response packets starts to increase. The actual queuing delay may be calculated by reading ri in equation 1 as a time of response of the i-th response packet at the transmission device 20.

Thus, the transmission device 20 according to the present example embodiment determines that a response interval between response packets starts to increase, by use of of a rising position of a queuing delay and a degree of inclination of an ideal curve. Consequently, even when a shape of an actually observed queuing delay of a packet train is jagged, the transmission device 20 can more accurately determine whether or not the behavior has a trend in which a real queuing delay occurs.

By thus configuring the transmission device 20, the transmission device 20 stops transmission of estimation packets when receiving a signal indicating that a reception interval between estimation packets starts to increase. When a reception interval between estimation packets starts to increase, a true value of an available bandwidth falls within a search range of the available bandwidth estimated by the available bandwidth estimation device 40, and therefore a communication load can be reduced by stopping transmission of estimation packets by the transmission device 20 from then onward. Further, by stopping transmission of estimation packets by the transmission device 20 after the true value of the available bandwidth falls within the search range of the available bandwidth, accuracy of the available bandwidth estimated by the available bandwidth estimation device 40 can be maintained high. Accordingly, a communication load can be reduced while maintaining estimation accuracy of available bandwidth estimation high.

Figure 14:
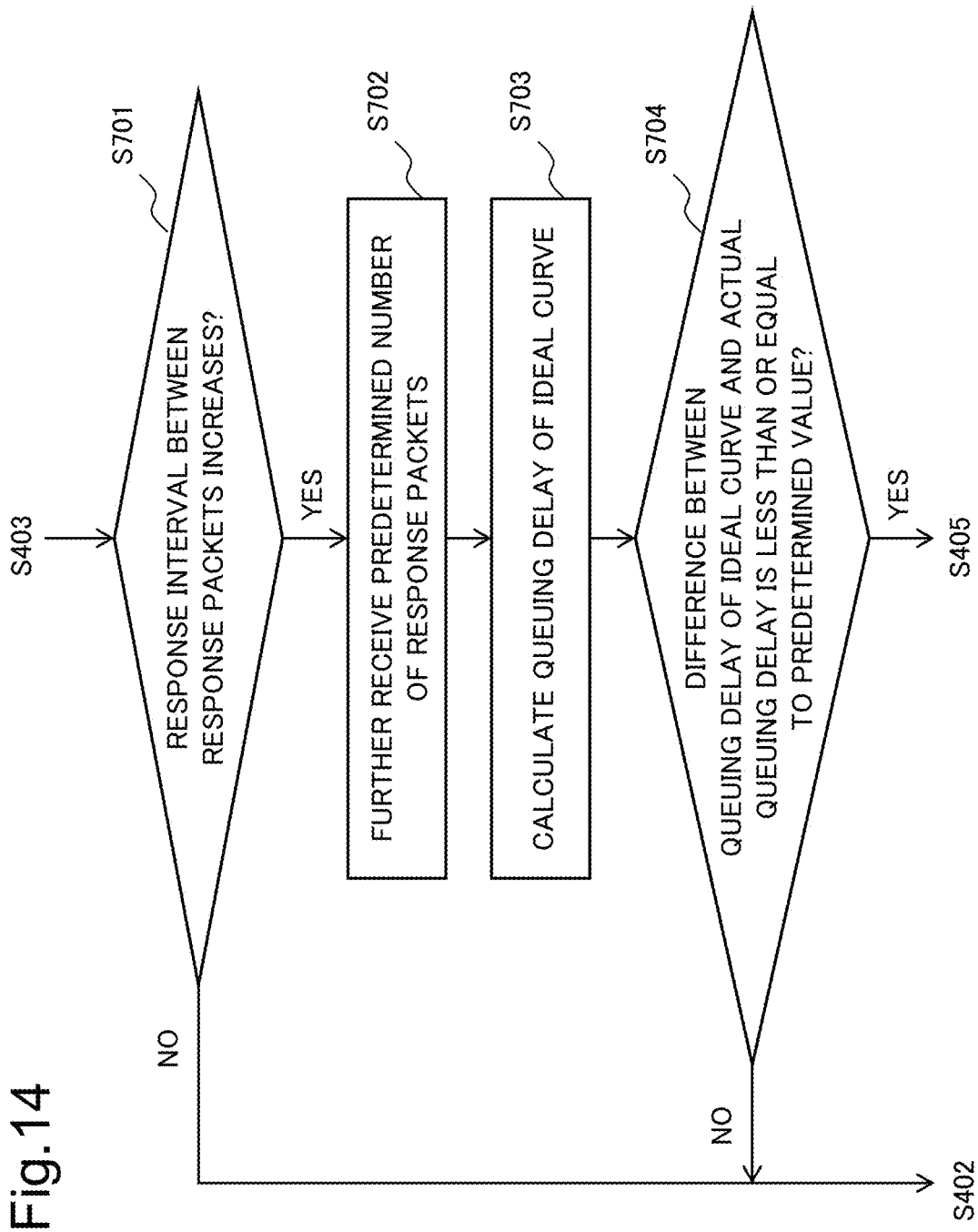
FIG. 14 shows a diagram illustrating an operation example of a transmission device according to a fifth example embodiment of the present invention.

Next, an operation example of the transmission device 20 according to the present example embodiment is described by use of FIG. 8 and FIG. 14. FIG. 14 shows an example of an operation executed in place of Step S404 in FIG. 8 by the transmission device 20. An operation example of the available bandwidth estimation device 40 is similar to that according to the third example embodiment (FIG. 9), and therefore description thereof is omitted.

First, the transmission device 20 executes Step S401 to Step S403 in FIG. 8. The operation is similar to that according to the third example embodiment, and therefore description thereof is omitted.

Next, the transmission device 20 determines whether a response interval between response packets increases (Step S701). The transmission device 20 determines that a response interval between response packets increases when a response interval between a received response packet and a response packet received last is greater than a response interval between a response packet received second to last and the response packet received last.

Further, when a response interval between response packets increases (YES in Step S701), the transmission device 20 further receives a predetermined number of response packets (Step S702).

Next, based on equation 2, the transmission device 20 calculates a queuing delay on an ideal curve with respect to the latest response packet (Step S703). Then, when a difference between an actual queuing delay of the latest response packet and the queuing delay on the ideal curve is less than or equal to a predetermined value (YES in Step S704), the transmission device 20 determines that a response interval between response packets starts to increase.

Next, when determining that a response interval between response packets starts to increase (YES in Step S704), the transmission device 20 stops transmission of estimation packets (Step S405 in FIG. 8). Then, the transmission device 20 notifies the available bandwidth estimation device 40 of the stop of the transmission of estimation packets to (Step S406).

By thus operating, the transmission device 20 stops transmission of estimation packets when receiving a signal indicating that a reception interval between estimation packets starts to increase. Accordingly, a communication load can be reduced while maintaining estimation accuracy of available bandwidth estimation high.

As described above, according to the fifth example embodiment of the present invention, the transmission device 20 stops transmission of estimation packets when receiving a signal indicating that a reception interval between estimation packets starts to increase. When a reception interval between estimation packets starts to increase, a true value of an available bandwidth falls within a search range of the available bandwidth estimated by the available bandwidth estimation device 40, and therefore a communication load can be reduced by stopping transmission of estimation packets by the transmission device 20 from then onward. Further, by stopping transmission of estimation packets by the transmission device 20 after the true value of the available bandwidth falls within the search range of the available bandwidth, accuracy of the available bandwidth estimated by the available bandwidth estimation device 40 can be maintained high. Accordingly, a communication load can be reduced while maintaining estimation accuracy of available bandwidth estimation high.

Further, the transmission device 20 according to the present example embodiment determines that a response interval between response packets starts to increase, by use of a rising position of a queuing delay and a degree of inclination of an ideal curve. Consequently, even when a shape of an actually observed queuing delay of a packet train is jagged, the transmission device 20 can more accurately determine whether or not the behavior has a trend in which a real queuing delay occurs.

[Hardware Configuration Example]

A configuration example of a hardware resource which implements, by use of one information processing device (computer), the transmission device (10, 20) and the available bandwidth estimation device (30, 40) (hereinafter, transmission device or the like) in each example embodiment of the present invention described above is described. Note that the transmission device or the like may be physically or functionally implemented by use of at least two information processing devices. Moreover, the transmission device or the like may be implemented as a dedicated device. Further, only some functions of the transmission device or the like may be implemented by use of an information processing device.

Figure 15:
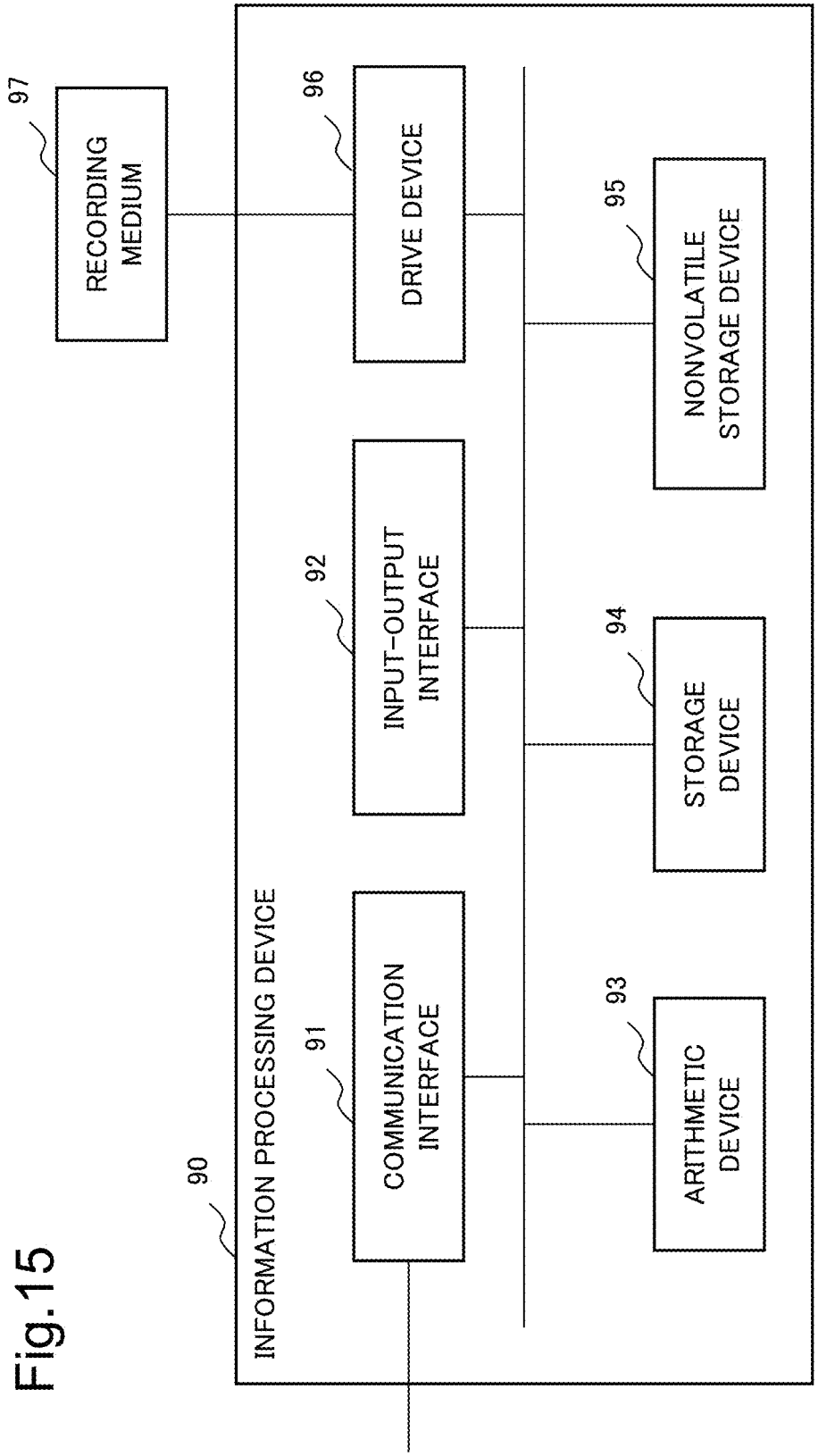
FIG. 15 shows a diagram illustrating a hardware configuration example according to each example embodiment of the present invention.
Figure 16:
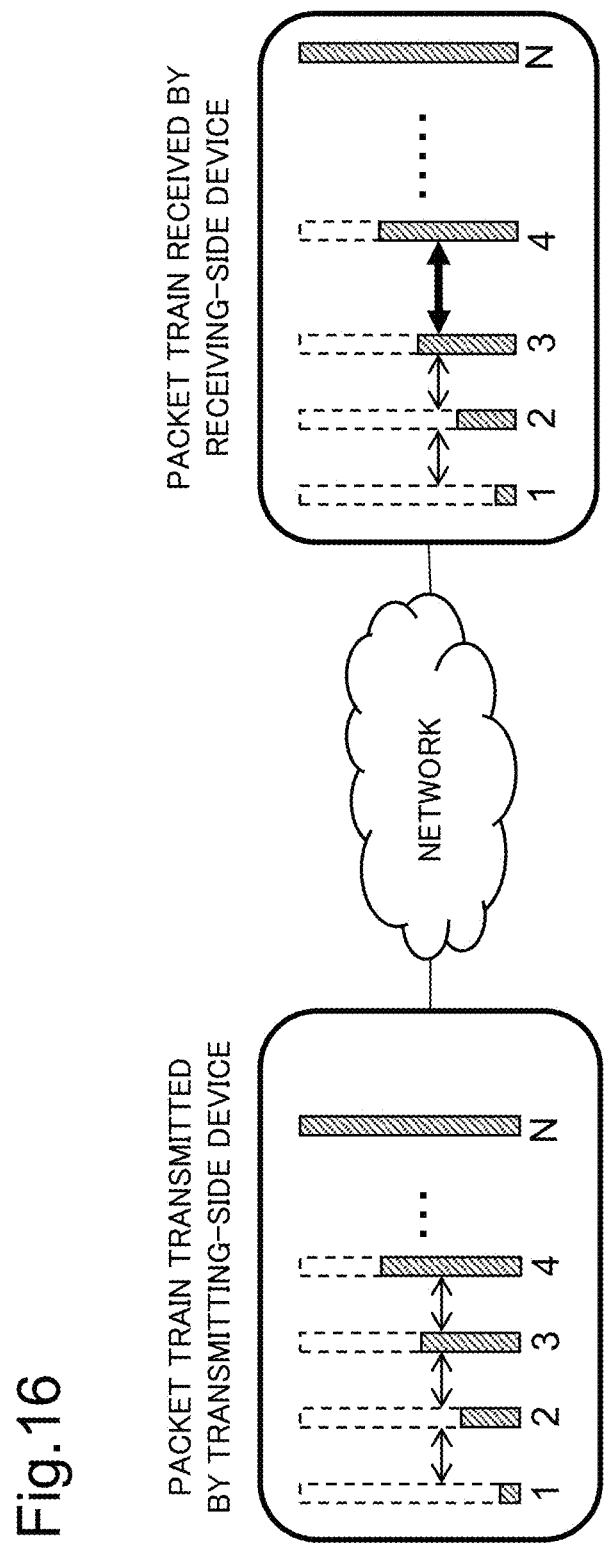
FIG. 16 shows a diagram illustrating an example of a packet train.

FIG. 15 is a diagram schematically showing a hardware configuration example of an information processing device being capable of implementing the transmission device or the like in each example embodiment of the present invention. An information processing device 90 includes a communication interface 91, an input/output interface 92, an arithmetic device 93, a storage device 94, a non-volatile storage device 95, and a drive device 96.

The communication interface 91 is a communication means with which the transmission device or the like in each example embodiment communicates with an external device in a wired or wireless way. Note that, when the transmission device or the like is implemented by use of at least two information processing devices, the devices may be connected to each other in such a way as to be able to mutually communicate via the communication interface 91.

The input/output interface 92 is a man machine interface such as a keyboard being one example of an input device, or a display as an output device.

The arithmetic device 93 is an arithmetic processing device such as a general-purpose central processing unit (CPU) or a microprocessor. The arithmetic device 93 can read, for example, various programs stored in the non-volatile storage device 95, into the storage device 94, and execute processing in accordance with the read program.

The storage device 94 is a memory device such as a random access memory (RAM) which can be referred to from the arithmetic device 93, and stores a program, various data, and the like. The storage device 94 may be a volatile memory device.

The non-volatile storage device 95 is a non-volatile storage device such as a read only memory (ROM), a flash memory, or the like, and can store various programs, data, and the like.

The drive device 96 is, for example, a device which processes reading and writing of data from and into a recording medium 97 described later.

The recording medium 97 is any recording medium such as an optical disk, a magneto-optical disk, a semiconductor flash memory or the like being capable of recording data.

Each example embodiment of the present invention may be implemented by, for example, configuring a transmission device or the like by the information processing device 90 exemplified in FIG. 15, and supplying this transmission device or the like with a program being capable of implementing a function described in each of the example embodiments described above.

In this case, the arithmetic device 93 executes the program supplied to the transmission device or the like, and thereby, an example embodiment can be implemented. Moreover, not all but some of the functions of the transmission device or the like can be configured by the information processing device 90.

Furthermore, the present invention may be configured in such a way that the program described above is recorded in the recording medium 97, and appropriately stored in the non-volatile storage device 95 at a shipment stage, an operation stage, or the like of the transmission device or the like. Note that, in this case, a method of installing the program described above into the transmission device or the like by utilizing a suitable jig at a manufacturing stage before shipment, an operation stage, or the like may be adopted as a method of supplying the program described above. Moreover, a general procedure such as a method of externally downloading the program described above via a communication line such as the Internet may be adopted as a method of supplying the program described above.

The whole or part of the example embodiments disclosed above can be described as, but not limited to, the following supplementary notes.

(Supplementary Note 1)

A transmission device comprising:

a transmission means for transmitting estimation packets, a packet size of each of which successively increases, to an available bandwidth estimation device at equal intervals; and a transmission stop means for stopping the transmission of the estimation packets when receiving a signal indicating that a reception interval between the estimation packets at the available bandwidth estimation device starts to increase.

(Supplementary Note 2)

The transmission device according to supplementary note 1, wherein the signal is a notification being received from the available bandwidth estimation device and indicating that the reception interval starts to increase.

(Supplementary Note 3)

The transmission device according to supplementary note 1, wherein the transmission means further receives, from the available bandwidth estimation device, a response packet responding to the estimation packet, the transmission device further comprises a response interval monitoring means for monitoring a response interval between the response packets, and when the response interval starts to increase, outputting a notification indicating that the response interval starts to increase, and the signal is a notification indicating that the response interval starts to increase.

(Supplementary Note 4)

The transmission device according to supplementary note 3, wherein, when making the stop of the transmission, the transmission stop means further notifies the available bandwidth estimation device of the stop of the transmission.

(Supplementary Note 5)

The transmission device according to supplementary note 3 or 4, wherein the response interval monitoring means determines that the response interval between the response packets starts to increase, when the response interval between the received response packet and the response packet received last is greater than the response interval between the response packet received second to last and the response packet received last.

(Supplementary Note 6)

The transmission device according to supplementary note 3 or 4, wherein the response interval monitoring means further receives a predetermined number of the response packets when the response interval between the received response packet and the response packet received last is greater than the response interval between the response packet received second to last and the response packet received last, and determines that the response interval between the response packets starts to increase when a difference between a queuing delay at the latest response packet and the queuing delay on an ideal curve is equal to or less than a predetermined value.

(Supplementary Note 7)

An available bandwidth estimation device comprising:

a reception means for receiving estimation packets which are transmitted by a transmission device at equal intervals, and a packet size of each of which successively increases; and an available bandwidth estimation means for, when the transmission of the estimation packets stops, estimating an available bandwidth, based on the estimation packets received up until then.

(Supplementary Note 8)

The available bandwidth estimation device according to supplementary note 7, further comprising a transmission stop request means for requesting, to the transmission device, the stop of the transmission of the estimation packets when a reception interval between the estimation packets starts to increase.

(Supplementary Note 9)

The available bandwidth estimation device according to supplementary note 8, wherein the transmission stop request means determines that the reception interval between the estimation packets starts to increase, when the reception interval between the received estimation packet and the estimation packet received last is greater than the reception interval between the estimation packet received second to last and the estimation packet received last.

(Supplementary Note 10)

The available bandwidth estimation device according to supplementary note 8, wherein the transmission stop request means further receives a predetermined number of the estimation packets when the reception interval between the received estimation packet and the estimation packet received last is greater than the reception interval between the estimation packet received second to last and the estimation packet received last, and determines that the reception interval between the estimation packets starts to increase when a difference between a queuing delay at the latest estimation packet and the queuing delay on an ideal curve is equal to or less than a predetermined value.

(Supplementary Note 11)

The available bandwidth estimation device according to supplementary note 7, wherein, when receiving the estimation packet, the reception means returns a response packet responding to the estimation packet to the transmission device.

(Supplementary Note 12)

The available bandwidth estimation device according to supplementary note 11, wherein the available bandwidth estimation means performs the estimation of the available bandwidth when receiving a notification indicating the stop of the transmission of the estimation packets from the transmission device.

(Supplementary Note 13)

An available bandwidth estimation system comprising:

the transmission device according to any one of supplementary notes 1 to 6; and the available bandwidth estimation device.

(Supplementary Note 14)

An available bandwidth estimation system comprising:

the transmission device according to supplementary note 2; and the available bandwidth estimation device, wherein the available bandwidth estimation device is the available bandwidth estimation device according to any one of supplementary notes 8 to 10, and a notification indicating that the reception interval starts to increase is the request for the stop of the estimation packets.

(Supplementary Note 15)

An available bandwidth estimation system comprising:

the transmission device according to any one of supplementary notes 3 to 6; and the available bandwidth estimation device, wherein the available bandwidth estimation device is the available bandwidth estimation device according to supplementary note 11 or 12.

(Supplementary Note 16)

An available bandwidth estimation system comprising:

the available bandwidth estimation device according to any one of supplementary notes 7 to 12; and the transmission device.

(Supplementary Note 17)

A transmission method comprising:

transmitting estimation packets, a packet size of each of which successively increases, to an available bandwidth estimation device at equal intervals; and, when receiving a signal indicating that a reception interval between the estimation packets at the available bandwidth estimation device starts to increase, stopping the transmission of the estimation packets.

(Supplementary Note 18)

The transmission method according to supplementary note 17, wherein the signal is a notification being received from the available bandwidth estimation device and indicating that the reception interval starts to increase.

(Supplementary Note 19)

The transmission method according to supplementary note 17, further comprising:

receiving, from the available bandwidth estimation device, a response packet responding to the estimation packet;

monitoring a response interval between the response packets; and outputting a notification indicating that the response interval starts to increase, when the response interval starts to increase, wherein the signal is a notification indicating that the response interval starts to increase.

(Supplementary Note 20)

The transmission method according to supplementary note 19, further comprising, notifying the available bandwidth estimation device of the stop of the transmission, when making the stop of the transmission.

(Supplementary Note 21)

The transmission method according to supplementary note 19 or 20, further comprising determining that the response interval between the response packets starts to increase, when the response interval between the received response packet and the response packet received last is greater than the response interval between the response packet received second to last and the response packet received last.

(Supplementary Note 22)

The transmission method according to supplementary note 19 or 20, further comprising:

receiving a predetermined number of the response packets when the response interval between the received response packet and the response packet received last is greater than the response interval between the response packet received second to last and the response packet received last; and determining that the response interval between the response packets starts to increase, when a difference between a queuing delay at the latest response packet and the queuing delay on an ideal curve is equal to or less than a predetermined value.

(Supplementary Note 23)

An available bandwidth estimation method comprising:

receiving estimation packets which are transmitted by a transmission device at equal intervals, and a packet size of each of which successively increases; and, estimating an available bandwidth, when the transmission of the estimation packets stops, based on the estimation packets received up until then.

(Supplementary Note 24)

The available bandwidth estimation method according to supplementary note 23, further comprising requesting, to the transmission device, the stop of the transmission of the estimation packets when a reception interval between the estimation packets starts to increase.

(Supplementary Note 25)

The available bandwidth estimation method according to supplementary note 24, further comprising determining that the reception interval between the estimation packets starts to increase, when the reception interval between the received estimation packet and the estimation packet received last is greater than the reception interval between the estimation packet received second to last and the estimation packet received last.

(Supplementary Note 26)

The available bandwidth estimation method according to supplementary note 24, further comprising:

receiving a predetermined number of the estimation packets when the reception interval between the received estimation packet and the estimation packet received last is greater than the reception interval between the estimation packet received second to last and the estimation packet received last; and determining that the reception interval between the estimation packets starts to increase, when a difference between a queuing delay at the latest estimation packet and the queuing delay on an ideal curve is equal to or less than a predetermined value.

(Supplementary Note 27)

The available bandwidth estimation method according to supplementary note 23, further comprising, returning a response packet responding to the estimation packet to the transmission device, when receiving the estimation packet.

(Supplementary Note 28)

The available bandwidth estimation method according to supplementary note 27, further comprising performing the estimation of the available bandwidth when receiving a notification indicating the stop of the transmission of the estimation packets from the transmission device.

(Supplementary Note 29)

A non-transitory computer readable recording medium recorded with a transmission program causing a computer to execute:

a transmission function of transmitting estimation packets, a packet size of each of which successively increases, to an available bandwidth estimation device at equal intervals; and a transmission stop function of stopping the transmission of the estimation packets when receiving a signal indicating that a reception interval between the estimation packets at the available bandwidth estimation device starts to increase.

(Supplementary Note 30)

The non-transitory computer readable recording medium recorded with the transmission program according to supplementary note 29, wherein the signal is a notification being received from the available bandwidth estimation device and indicating that the reception interval starts to increase.

(Supplementary Note 31)

The non-transitory computer readable recording medium recorded with the transmission program according to supplementary note 29, wherein the transmission function further receives, from the available bandwidth estimation device, a response packet responding to the estimation packet, the transmission program further causes a computer to execute a response interval monitoring function of monitoring a response interval between the response packets, and when the response interval starts to increase, outputting a notification indicating that the response interval starts to increase, and the signal is a notification indicating that the response interval starts to increase.

(Supplementary Note 32)

The non-transitory computer readable recording medium recorded with the transmission program according to supplementary note 31, wherein, when making the stop of the transmission, the transmission stop function further notifies the available bandwidth estimation device of the stop of the transmission.

(Supplementary Note 33)

The non-transitory computer readable recording medium recorded with the transmission program according to supplementary note 31 or 32, wherein the response interval monitoring function determines that the response interval between the response packets starts to increase, when the response interval between the received response packet and the response packet received last is greater than the response interval between the response packet received second to last and the response packet received last.

(Supplementary Note 34)

The non-transitory computer readable recording medium recorded with the transmission program according to supplementary note 31 or 32, wherein the response interval monitoring function further receives a predetermined number of the response packets when the response interval between the received response packet and the response packet received last is greater than the response interval between the response packet received second to last and the response packet received last, and determines that the response interval between the response packets starts to increase when a difference between a queuing delay at the latest response packet and the queuing delay on an ideal curve is equal to or less than a predetermined value.

(Supplementary Note 35)

A non-transitory computer readable recording medium recorded with an available bandwidth estimation program causing a computer to execute:

a reception function of receiving estimation packets which are transmitted by a transmission device at equal intervals, and a packet size of each of which successively increases; and an available bandwidth estimation function of, when the transmission of the estimation packets stops, estimating an available bandwidth, based on the estimation packets received up until then.

(Supplementary Note 36)

The non-transitory computer readable recording medium recorded with the available bandwidth estimation program according to supplementary note 35, further causing a computer to execute a transmission stop request function of requesting, to the transmission device, the stop of the transmission of the estimation packets when a reception interval between the estimation packets starts to increase.

(Supplementary Note 37)

The non-transitory computer readable recording medium recorded with the available bandwidth estimation program according to supplementary note 36, wherein the transmission stop request function determines that the reception interval between the estimation packets starts to increase, when the reception interval between the received estimation packet and the estimation packet received last is greater than the reception interval between the estimation packet received second to last and the estimation packet received last.

(Supplementary Note 38)

The non-transitory computer readable recording medium recorded with the available bandwidth estimation program according to supplementary note 36, wherein the transmission stop request function further receives a predetermined number of the estimation packets when the reception interval between the received estimation packet and the estimation packet received last is greater than the reception interval between the estimation packet received second to last and the estimation packet received last, and determines that the reception interval between the estimation packets starts to increase when a difference between a queuing delay at the latest estimation packet and the queuing delay on an ideal curve is equal to or less than a predetermined value.

(Supplementary Note 39)

The non-transitory computer readable recording medium recorded with the available bandwidth estimation program according to supplementary note 35, wherein, when receiving the estimation packet, the reception function returns a response packet responding to the estimation packet to the transmission device.

(Supplementary Note 40)

The non-transitory computer readable recording medium recorded with the available bandwidth estimation program according to supplementary note 39, wherein the available bandwidth estimation function performs the estimation of the available bandwidth when receiving a notification indicating the stop of the transmission of the estimation packets from the transmission device.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-096507, filed on May 15, 2017, the disclosure of which is incorporated herein in its entirety by reference.

REFERENCE SIGNS LIST

10, 20 Transmission device
11 Transmission unit
12 Transmission stop unit
23 Response interval monitoring unit
30, 40 Available bandwidth estimation device
31 Reception unit
32 Available bandwidth estimation unit
33 Transmission stop request unit
80 Network
90 Information processing device
91 Communication interface
92 Input-output interface
93 Arithmetic device
94 Storage device
95 Nonvolatile storage device
96 Drive device
97 Recording medium

The invention claimed is:

1. A transmission device comprising one or more memories storing instructions and one or more processors configured to execute the instructions to:

transmit estimation packets, a packet size of each of which successively increases, to an available bandwidth estimation device at equal intervals; and stop the transmission of the estimation packets when receiving a signal indicating that a reception interval between the estimation packets at the available bandwidth estimation device starts to increase, wherein the one or more processors configured to execute the instructions to determine that the response interval between the response packets starts to increase, when the response interval between the received response packet and the response packet received last is greater than the response interval between the response packet received second to last and the response packet received last.

2. An available bandwidth estimation device comprising one or more memories storing instructions and one or more processors configured to execute the instructions to:

receive estimation packets which are transmitted by a transmission device at equal intervals, and a packet size of each of which successively increases; and when the transmission of the estimation packets stops, estimate an available bandwidth, based on the estimation packets received up until then, wherein the one or more processors configured to execute the instructions to request, to the transmission device, the stop of the transmission of the estimation packets when a reception interval between the estimation packets starts to increase, wherein the one or more processors configured to execute the instructions to determine that the reception interval between the estimation packets starts to increase, when the reception interval between the received estimation packet and the estimation packet received last is greater than the reception interval between the estimation packet received second to last and the estimation packet received last.

3. An available bandwidth estimation method comprising:
receiving estimation packets which are transmitted by a transmission device at equal intervals, and a packet size of each of which successively increases; and,
estimating an available bandwidth, when the transmission of the estimation packets stops, based on the estimation packets received up until then, further comprising
requesting, to the transmission device, the stop of the transmission of the estimation packets when a reception interval between the estimation packets starts to increase, further comprising
determining that the reception interval between the estimation packets starts to increase, when the reception interval between the received estimation packet and the estimation packet received last is greater than the reception interval between the estimation packet received second to last and the estimation packet received last.

4. A transmission device comprising one or more memories storing instructions and one or more processors configured to execute the instructions to:
transmit estimation packets, a packet size of each of which successively increases, to an available bandwidth estimation device at equal intervals; and
stop the transmission of the estimation packets when receiving a signal indicating that a reception interval between the estimation packets at the available bandwidth estimation device starts to increase, wherein
the one or more processors configured to execute the instructions to receive, from the available bandwidth estimation device, a response packet responding to the estimation packet,
the one or more processors configured to execute the instructions to monitor a response interval between the response packets, and when the response interval starts to increase, output a notification indicating that the response interval starts to increase, and
the signal is a notification indicating that the response interval starts to increase, wherein,
when making the stop of the transmission, the one or more processors configured to execute the instructions to notify the available bandwidth estimation device of the stop of the transmission, wherein
the processor determines that the response interval between the response packets starts to increase, when the response interval between the received response packet and the response packet received last is greater than the response interval between the response packet received second to last and the response packet received last.

* * * * *